(12) United States Patent
Egger et al.

(10) Patent No.: US 11,873,942 B2
(45) Date of Patent: Jan. 16, 2024

(54) PIPE END PROTECTOR

(71) Applicant: Tenaris Connections B.V., Amsterdam (NL)

(72) Inventors: Pablo Egger, Buenos Aires (AR); Angel Andres Carballo, Buenos Aires (AR)

(73) Assignee: Tenaris Connections B.V., Amsterdam (NL)

( * ) Notice: Subject to any disclaimer, the term of this patent is extended or adjusted under 35 U.S.C. 154(b) by 0 days.

(21) Appl. No.: 17/780,472

(22) PCT Filed: Nov. 27, 2020

(86) PCT No.: PCT/EP2020/083739
§ 371 (c)(1),
(2) Date: May 26, 2022

(87) PCT Pub. No.: WO2021/105430
PCT Pub. Date: Jun. 3, 2021

(65) Prior Publication Data
US 2023/0003332 A1    Jan. 5, 2023

(30) Foreign Application Priority Data
Nov. 29, 2019  (NL) ...................................... 2024342

(51) Int. Cl.
*F16L 57/00* (2006.01)
*E21B 17/00* (2006.01)

(52) U.S. Cl.
CPC .......... *F16L 57/005* (2013.01); *E21B 17/006* (2013.01); *F16L 2201/80* (2013.01)

(58) Field of Classification Search
CPC ... F16L 57/005; F16L 58/182; F16L 55/1152; F16L 15/04
USPC ........................................ 138/96 T, 96 R, 109
See application file for complete search history.

(56) References Cited

U.S. PATENT DOCUMENTS

| | | | | |
|---|---|---|---|---|
| 4,796,668 | A * | 1/1989 | Depret ................... | B65D 59/00 138/96 T |
| 7,469,721 | B2 * | 12/2008 | Takano ................ | E21B 17/006 138/96 T |
| 2005/0045240 | A1 * | 3/2005 | Casteran ............... | F16L 57/005 138/96 T |
| 2015/0308605 | A1 * | 10/2015 | Aguilar ................. | E21B 17/042 138/96 T |
| 2017/0370160 | A1 * | 12/2017 | Aguilar Mendez ..... | F16L 15/04 |
| 2018/0274711 | A1 * | 9/2018 | Aguilar Mendez ... | E21B 17/006 |

* cited by examiner

*Primary Examiner* — Patrick F Brinson
(74) *Attorney, Agent, or Firm* — KNOBBE, MARTENS, OLSON & BEAR, LLP

(57) ABSTRACT

A pipe end protector for protecting pipe threads provided on a female pipe end of a pipe component for exploration and production of a hydrocarbon well, said pipe end protector comprising a main body and an annular flexible axial lip seal, wherein the main body is made from a first polymeric material having a first elastic modulus, and the lip seal is made from a second polymeric material having a second elastic modulus which is lower than the first elastic modulus.

22 Claims, 28 Drawing Sheets

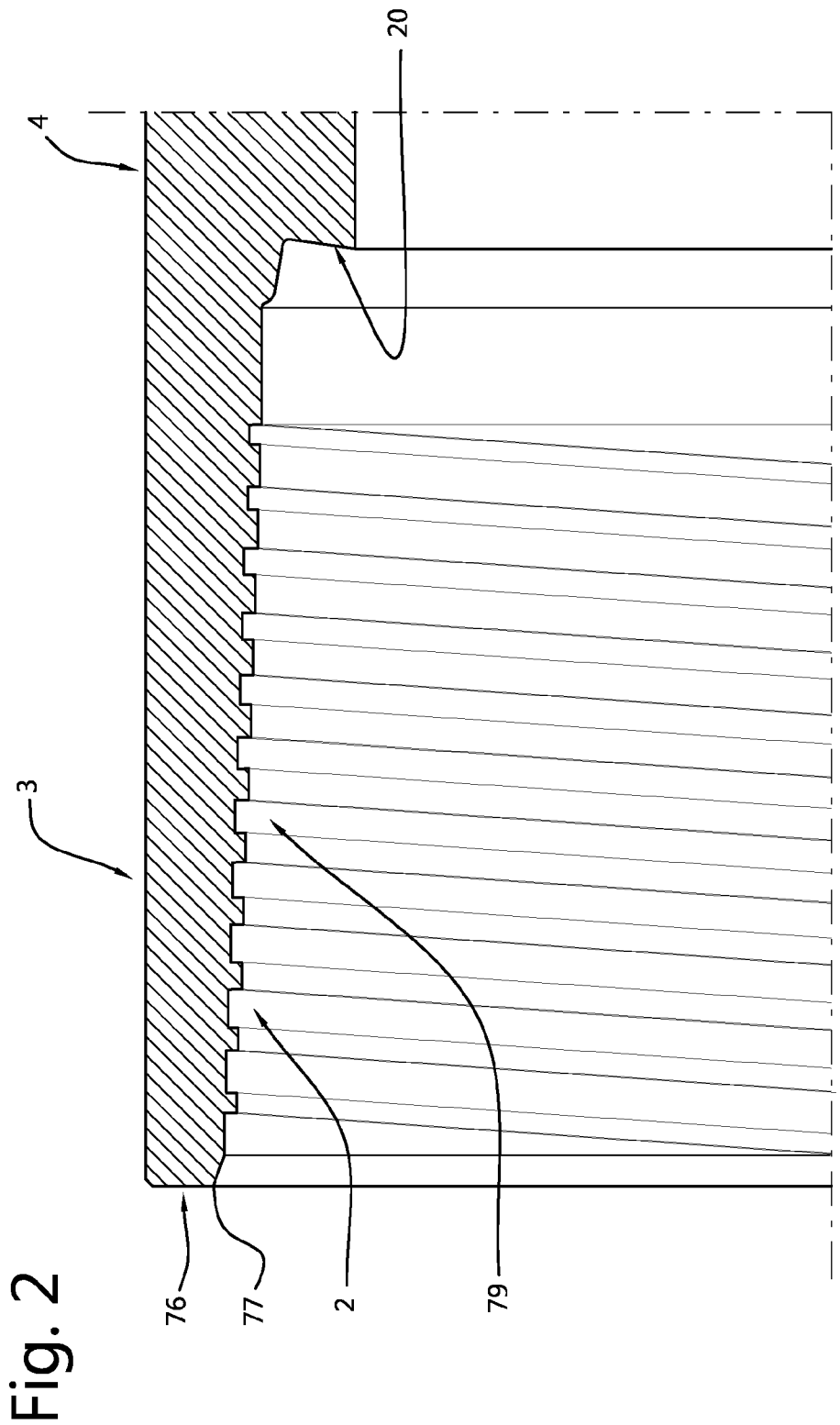

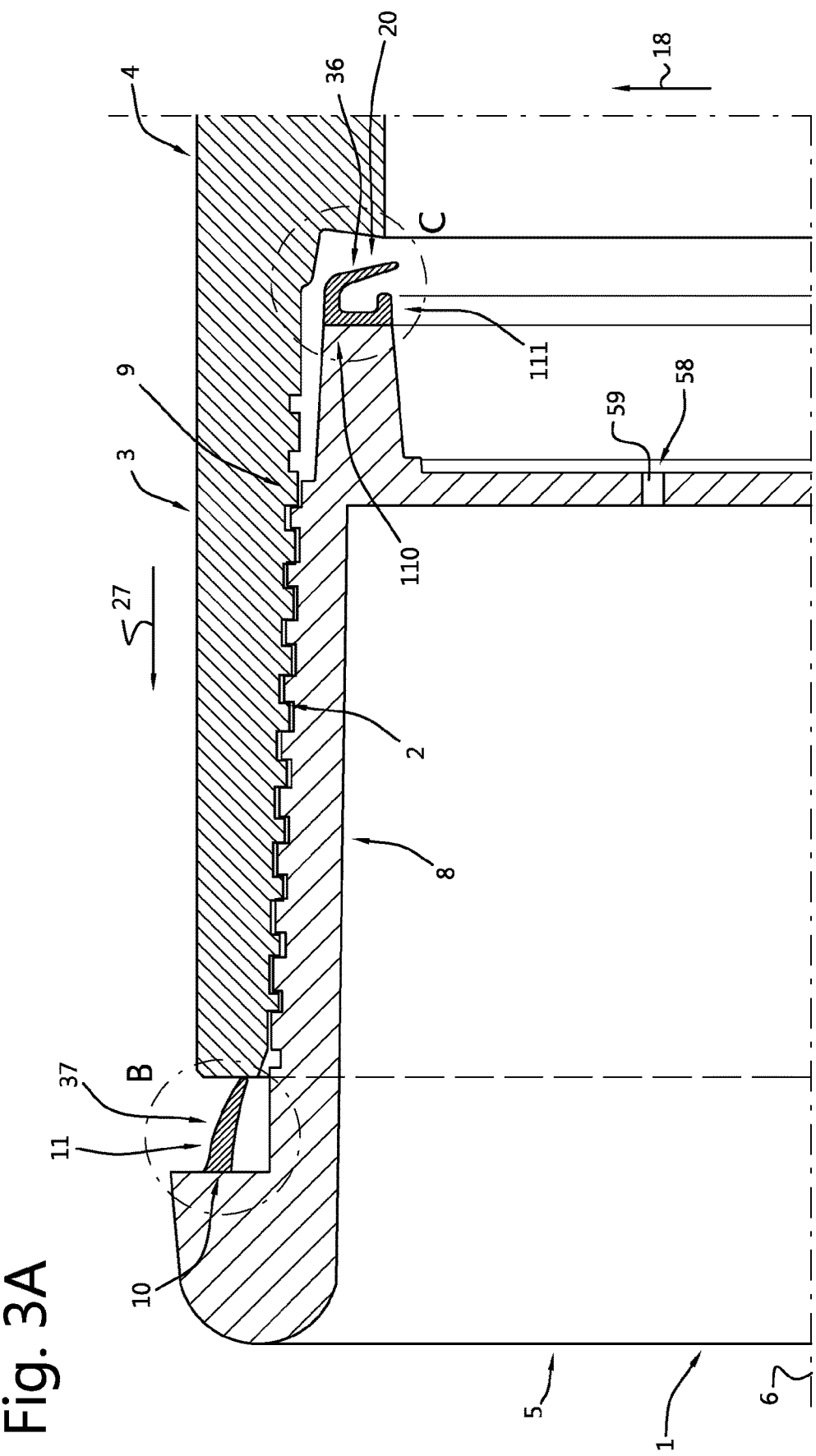

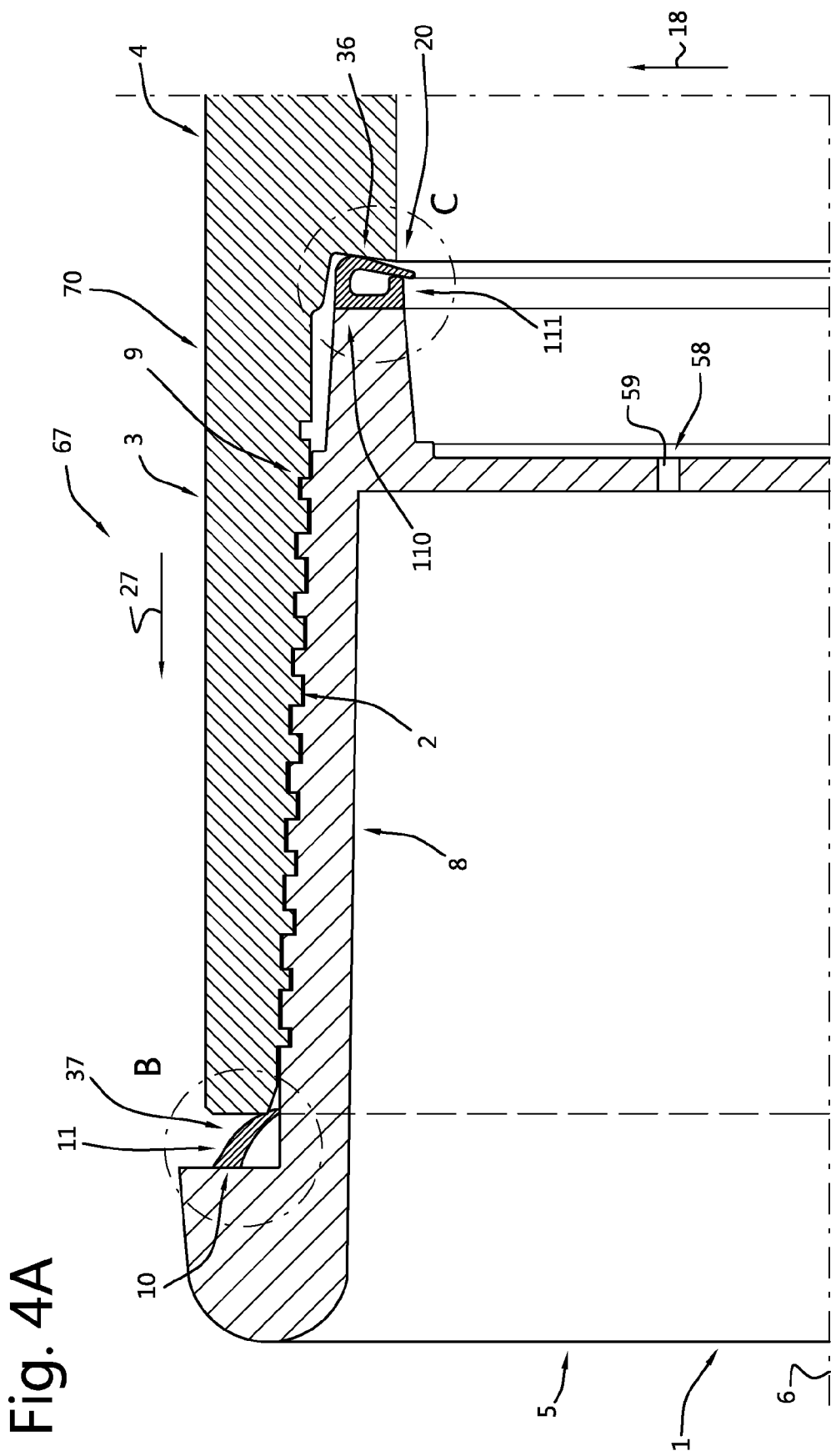

Figure 1A:
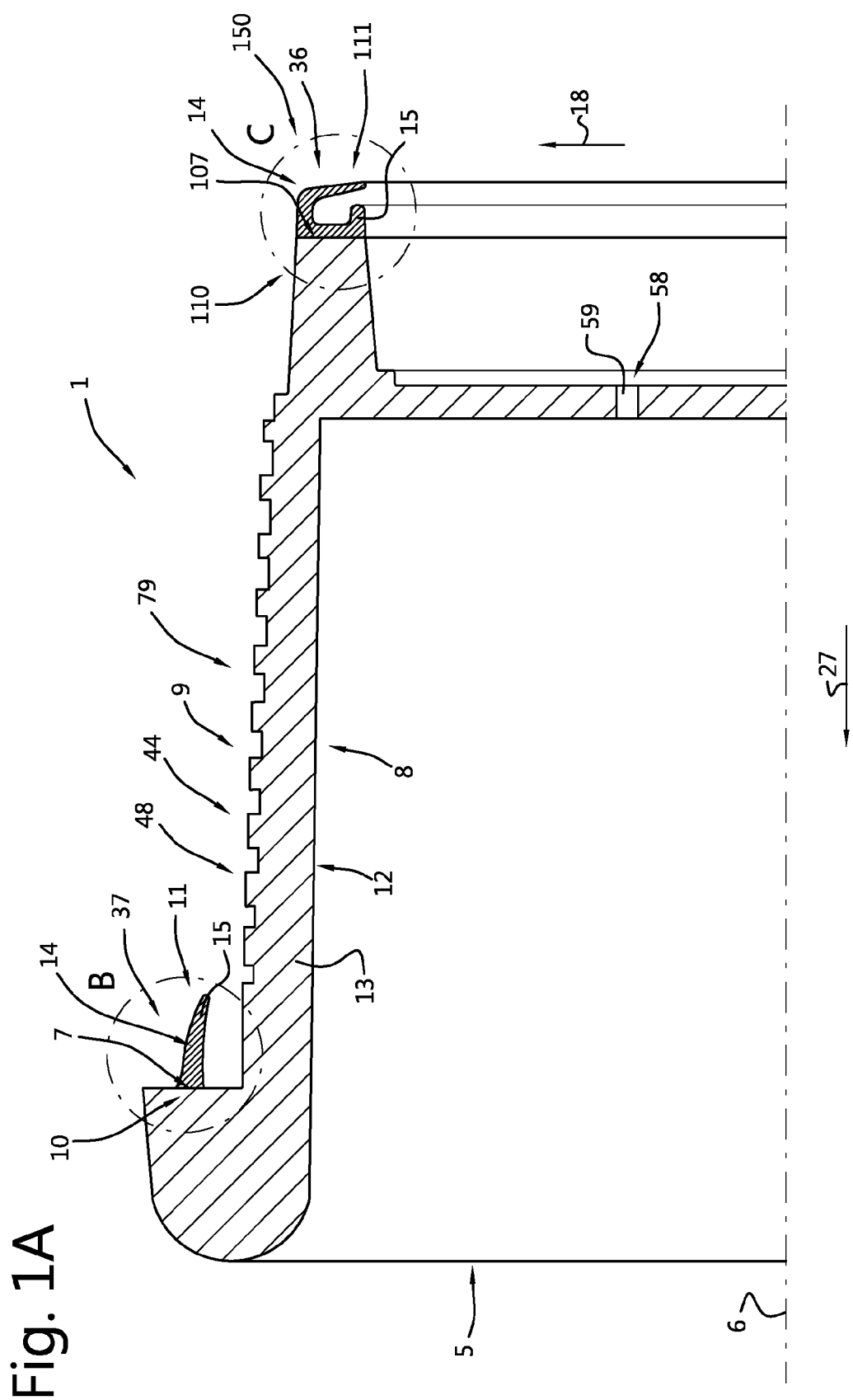

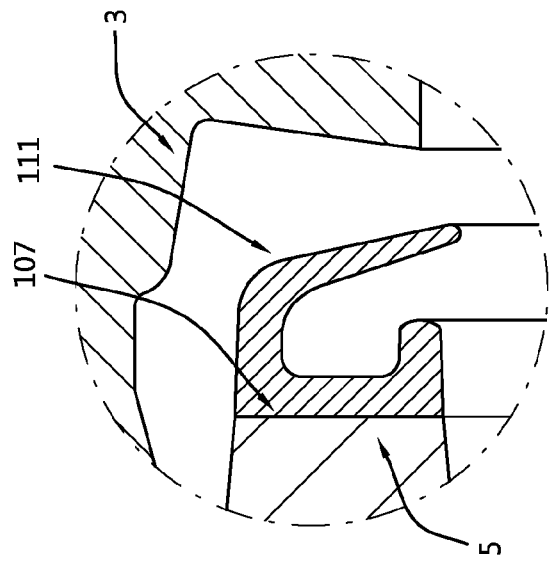
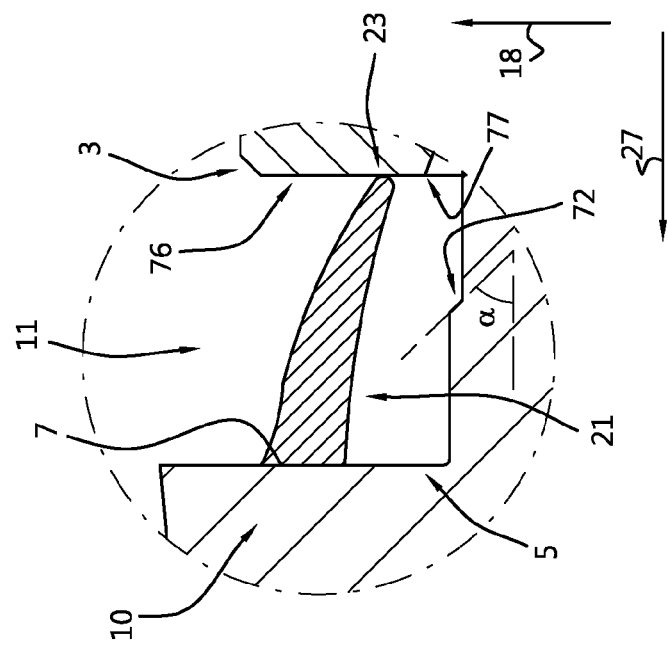
Fig. 5C
Fig. 5B

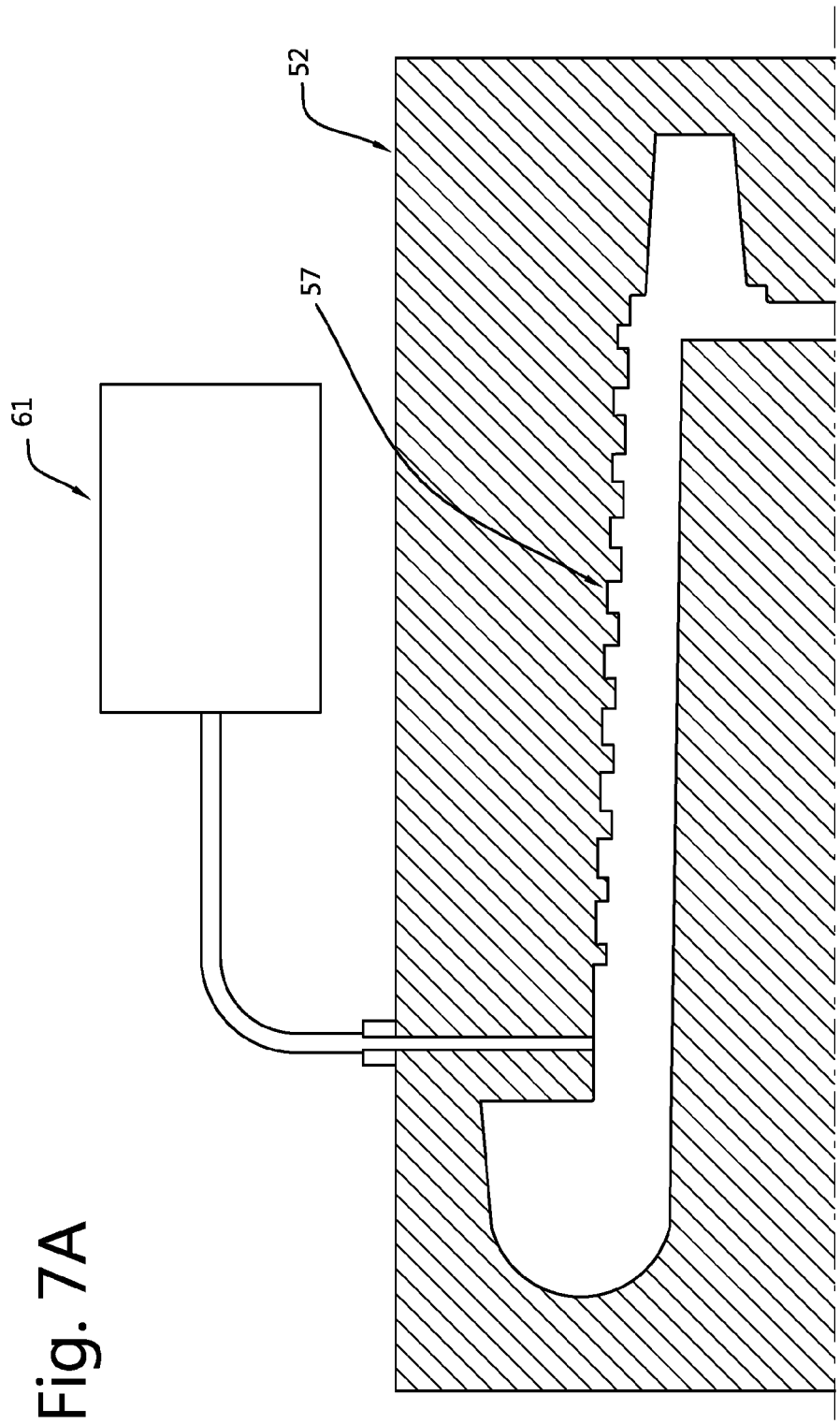

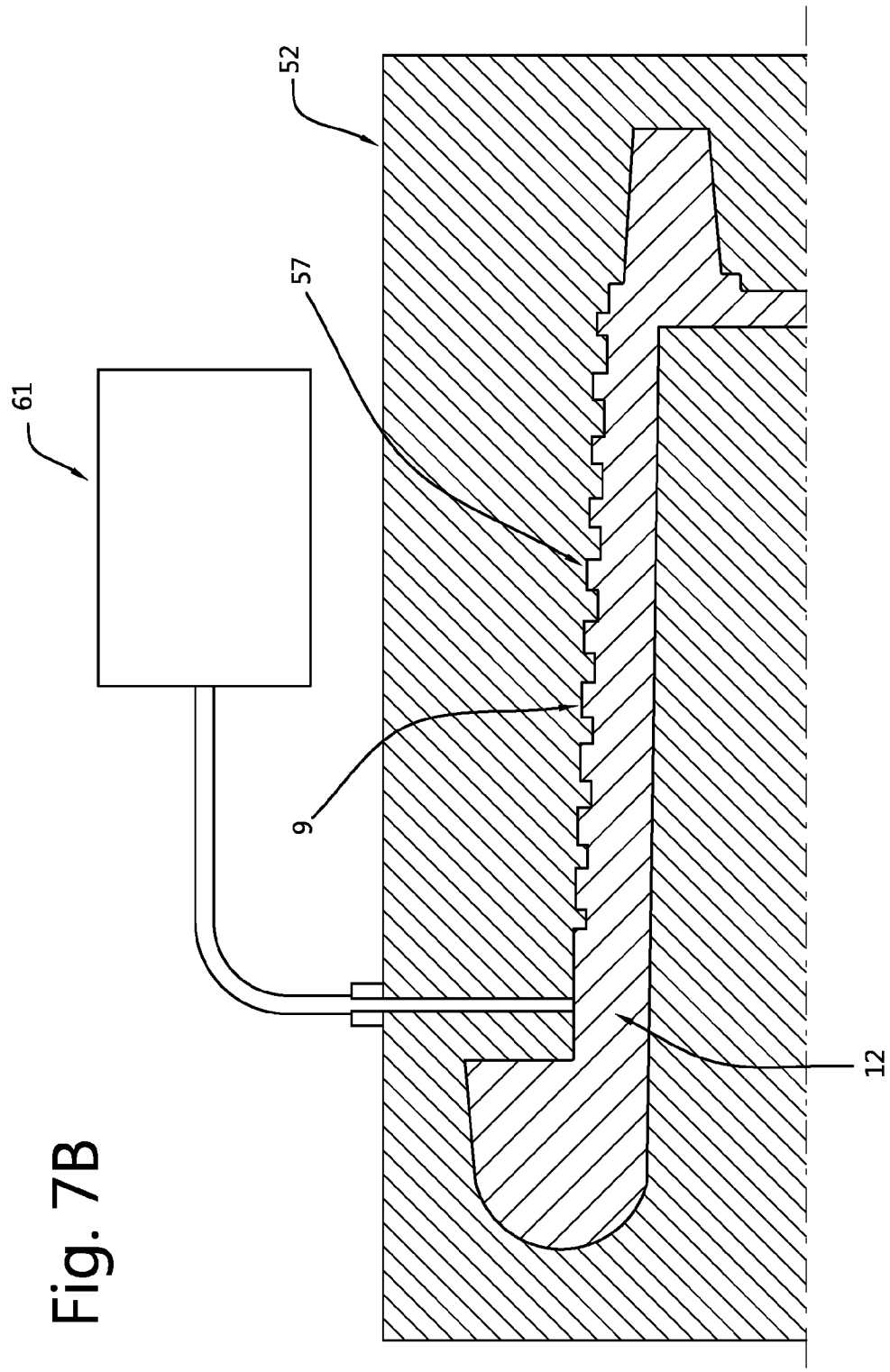

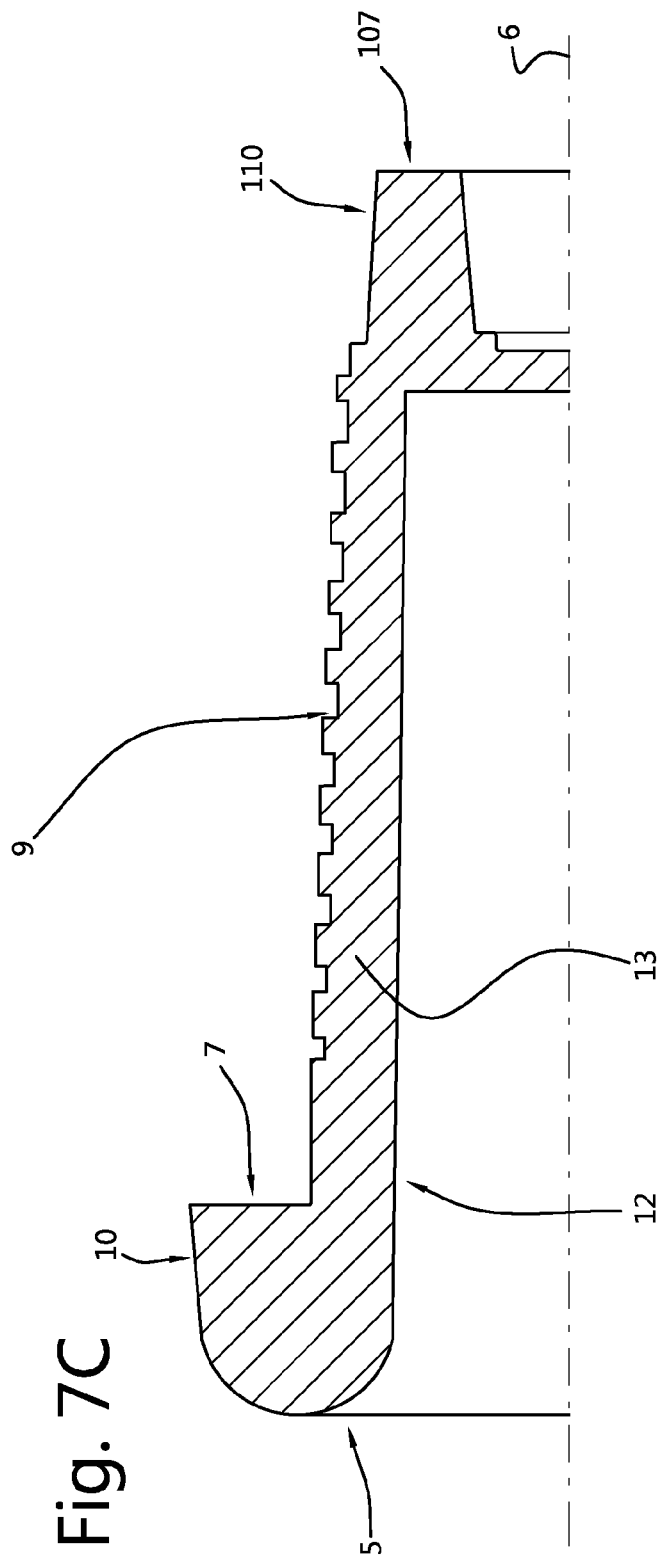

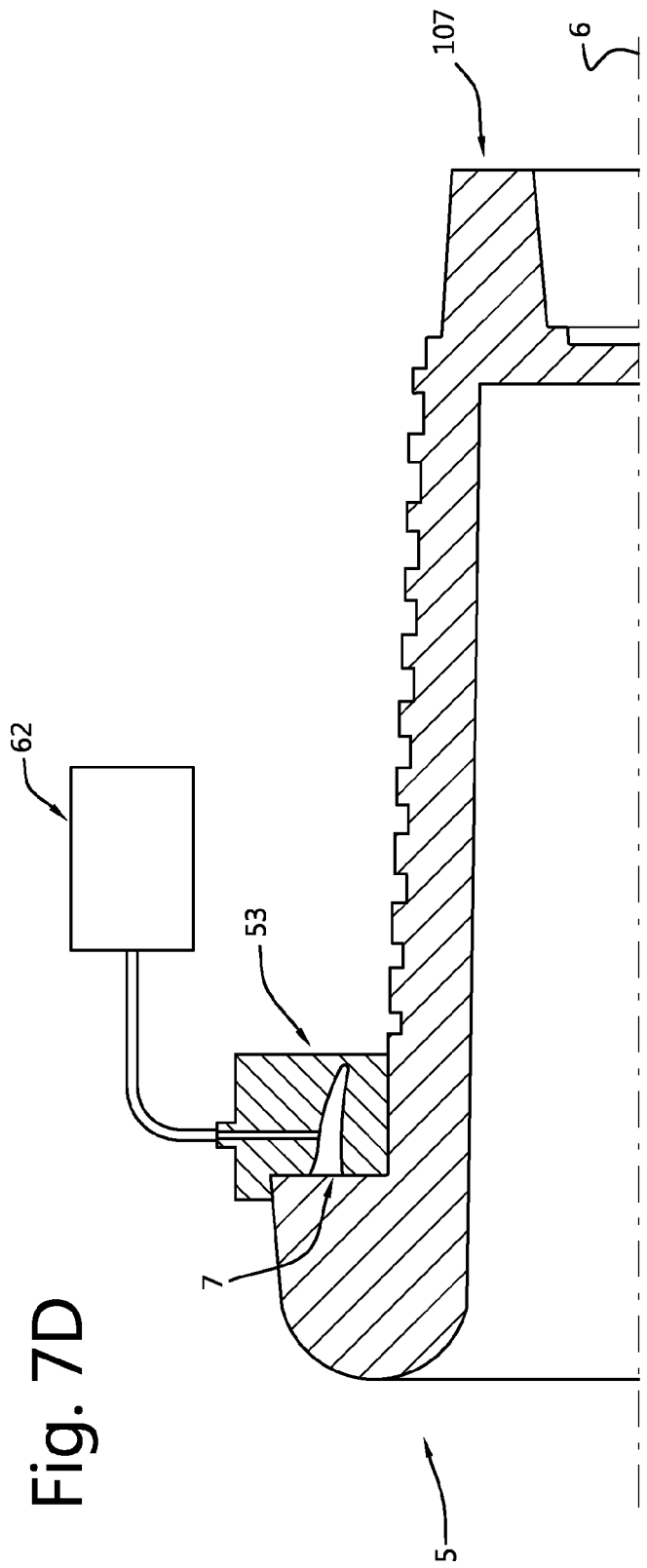

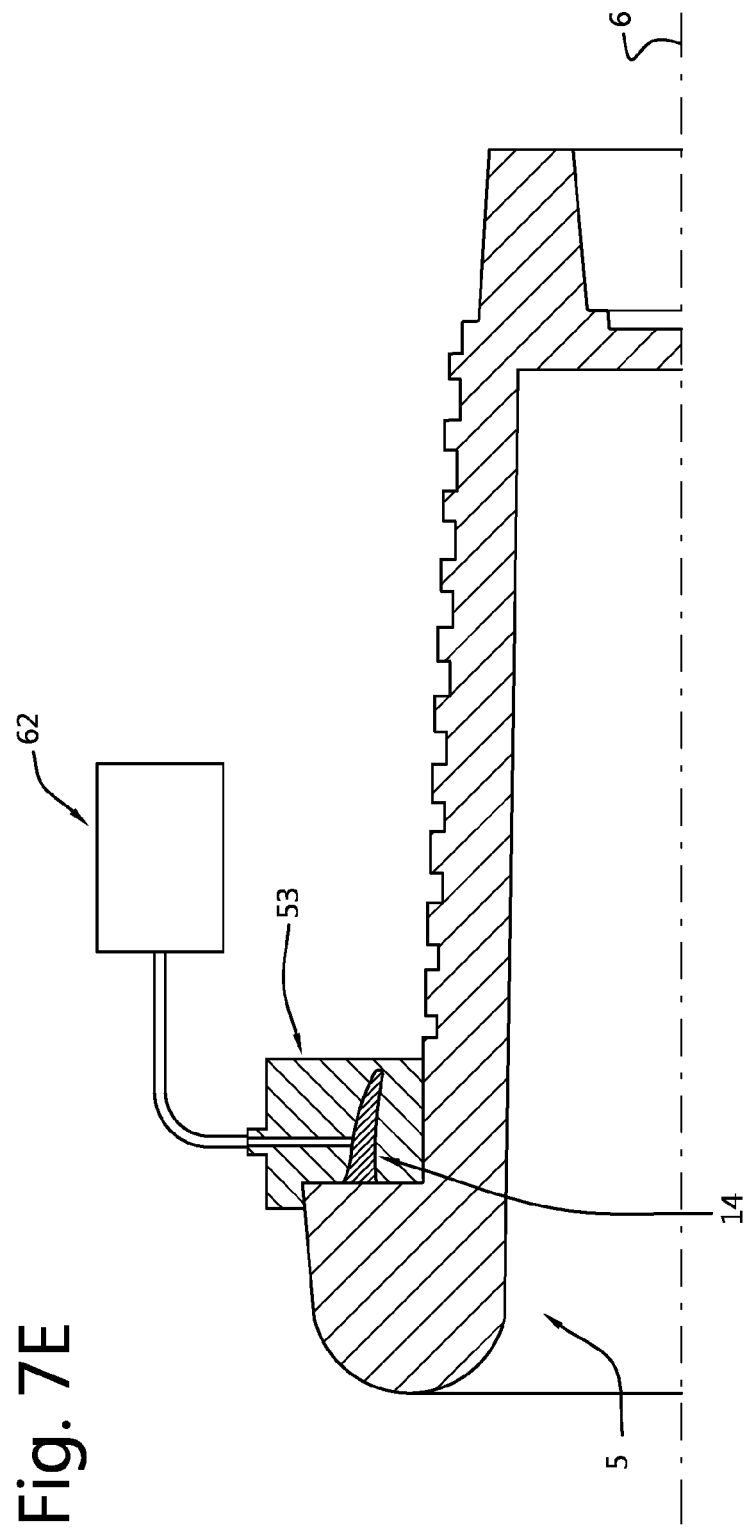

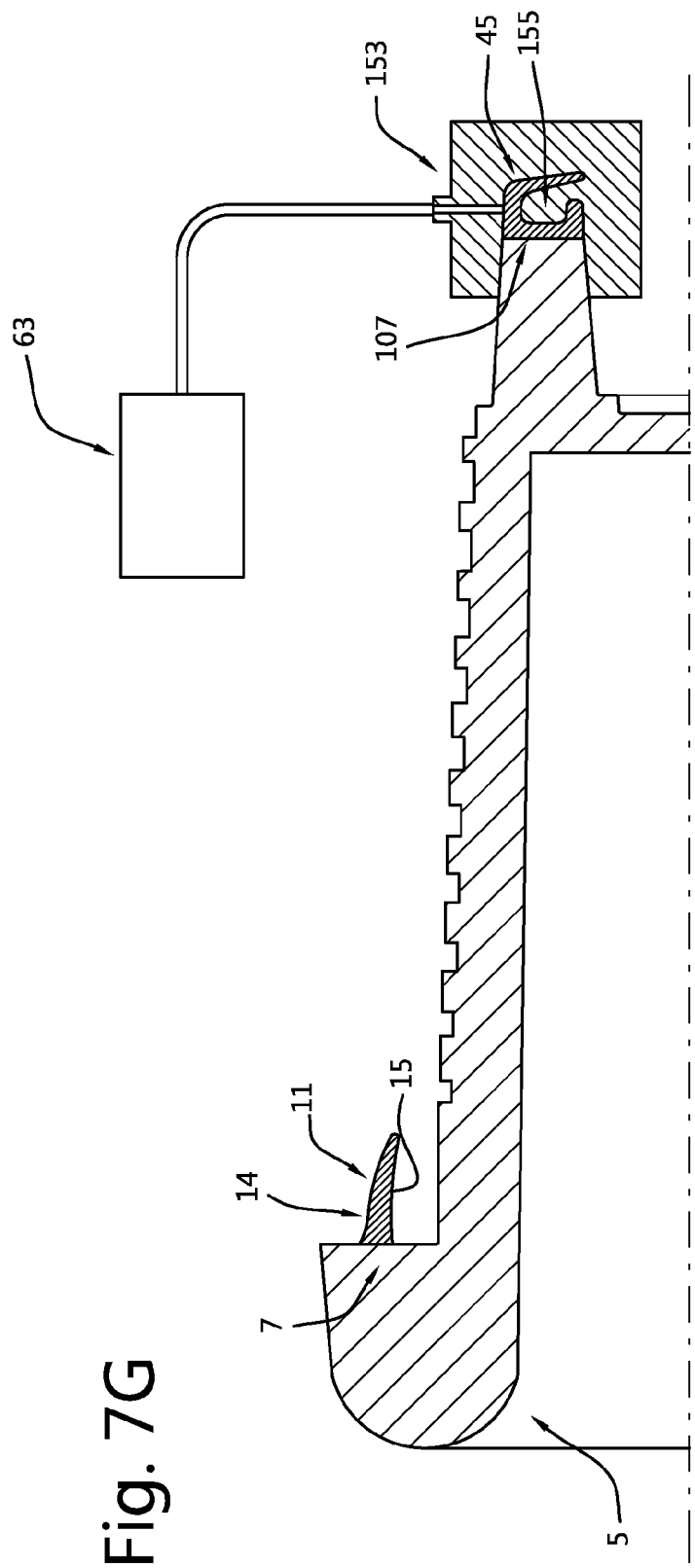

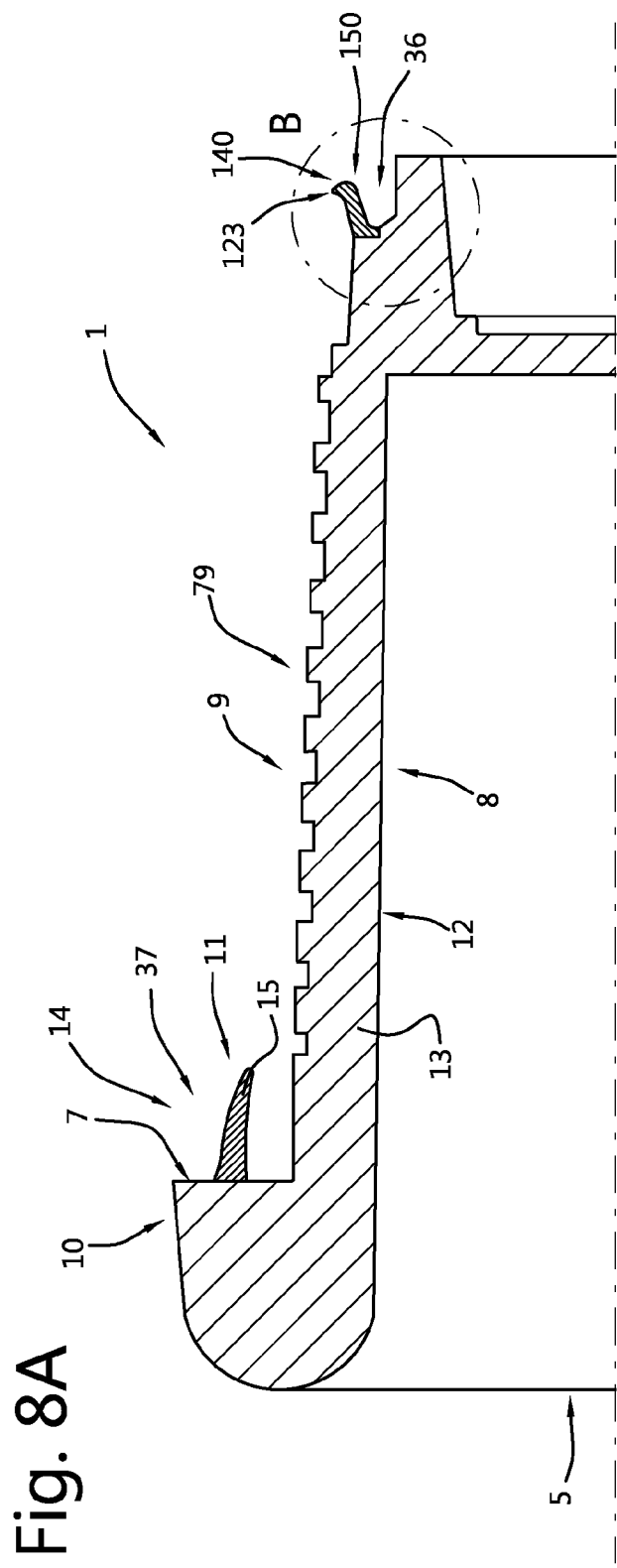

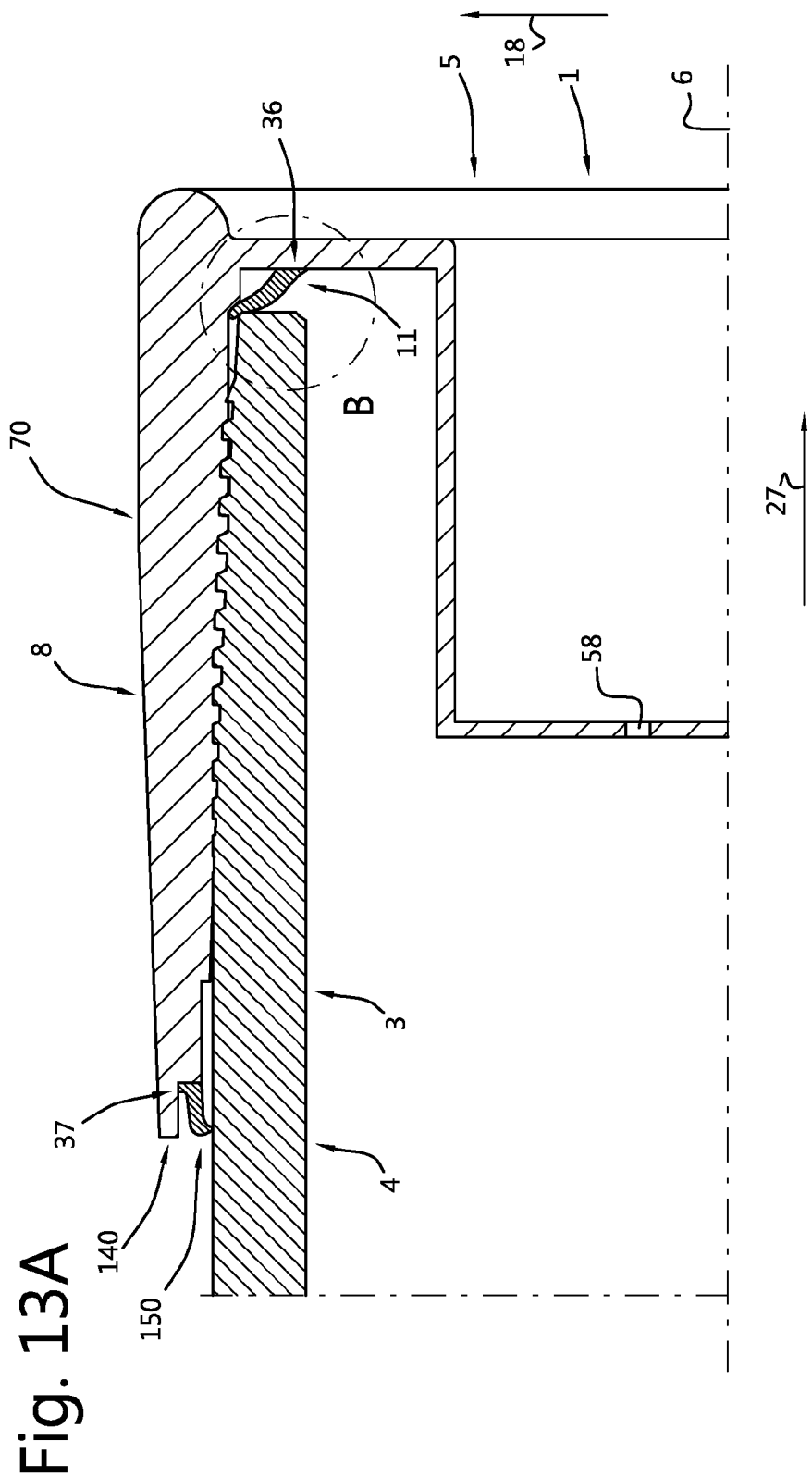

PIPE END PROTECTOR

FIELD OF THE INVENTION

The invention relates to a pipe end protector for protecting pipe threads provided on a pipe end of a pipe component for exploration and production of a hydrocarbon well, and to an assembly comprising such a pipe end protector and pipe component. The invention also relates to a method for producing such pipe end protector.

After a pipe component for exploration and production of a hydrocarbon well has been produced, it must be shipped to the location when the exploration and production of the hydrocarbon well takes place. During this transport, there is a high risk that the pipe threads of the pipe end will get damaged. In order to reduce this risk, a pipe end protector is screwed onto the pipe end to cover the pipe threads. To avoid that moisture or small solid particles, e.g. dust, accumulates at the pipe threads, the pipe end protector is provided with at least one seal. In general, the pipe end protector has an internal seal and an external seal and the pipe threads are located between the internal seal and the external seal.

BACKGROUND OF THE INVENTION

Known pipe end protectors comprise a main body having a longitudinal axis and a tubular portion provided with protector threads configured to cooperate with the pipe threads of the pipe end. Grooves are provided in the main body and an internal seal and an external seal are manually placed in said grooves.

This pipe end protector has the disadvantage that the production costs are relatively high. This is amongst others caused by the fact that the seals are manually placed in the grooves.

In addition, the seal may move out of its grooves when the pipe end protector is re-used. As result of this, the average sealing capacity of the pipe end protector reduces relatively fast when it is re-used. The pipe end protector can therefore in general only be re-used for a relatively limited number of times.

Pipe end protectors can be divided into two different groups, namely pipe protectors for male pipe ends and pipe end protectors for female pipe ends. Due to the differences in the design of the male pipe ends and the female pipe ends, each of the two groups of different pipe end protectors may have its own unique challenges.

SUMMARY OF THE INVENTION

The invention has the objective to provide an improved, or at least alternative, pipe end protector for protecting pipe threads provided on a pipe end of a pipe component for exploration and production of a hydrocarbon well. Said pipe end protector comprising;
- a main body having a longitudinal axis, a support portion having an at least partly radially extending annular seal support surface, and a tubular portion provided with protector threads configured to cooperate with the pipe threads of the pipe end, and
- an annular flexible axial lip seal provided on the seal support surface, wherein;
- the main body is made from a first polymeric material having a first elastic modulus,
- the axial lip seal is made from a second polymeric material having a second elastic modulus which is lower than the first elastic modulus,
- the axial lip seal comprises an annular lip base portion which extends radially along at least part of the seal support surface and is attached to the seal support surface by overmoulding,
- the axial lip seal comprises an annular lip which extends from the lip base portion to a free rim of the lip, which free rim is axially spaced from the lip base portion, and wherein;
- the pipe end protector is configured for a female pipe end and the lip is configured to be bent towards the longitudinal axis by a female nose surface of the female pipe end when the support portion and the female pipe end are moved axially towards each other during rotational make-up of the pipe end protector on the female pipe end in order to position the free rim between the female pipe end and the longitudinal axis when (in use) a final make-up position of the pipe end protector on the female pipe end is reached, OR
- the pipe end protector is configured for a male pipe end and the lip is configured to be bent away from the longitudinal axis by a male nose surface of the male pipe end when the support portion and the male pipe end are moved axially towards each other during rotational make-up of the pipe end protector on the male pipe end in order to position the male pipe end between the free rim and the longitudinal axis when (in use) a final make-up position of the pipe end protector on the male pipe end is reached.

Overmoulding the axial lip seal on the main body allows that the pipe end protector can be produced in an efficient manner with less manual labour. In addition, the overmoulding ensures that the axial lip seal remains in position even when the pipe end protector is re-used.

The axial lip seal is configured to deal with the specific characteristics of a female pipe end and the male pipe end and to create a secure seal between the pipe end protector and the female pipe end or between the pipe end protector and the male pipe end.

Since the axial lip seal has slender parts (when seen in a cross sectional view along the longitudinal axis), it is very suitable to be produced by overmoulding in an efficient manner.

The position of the free rim between the female pipe end and the longitudinal axis ensures that the lip is pushed against the female pipe end to increase the sealing effect of the axial lip seal.

The positon of the free rim between the female pipe end and the longitudinal axis relates to the positon of the free rim with respect to the female pipe end and the longitudinal axis in radial direction.

The position of the male pipe end between the free rim and the longitudinal axis ensures that the lip is pushed against the male pipe end to increase the sealing effect of the axial lip seal.

The position of the male pipe end between the free rim and the longitudinal axis relates to the position of the male pipe end with respect to the free rim and the longitudinal axis in radial direction.

The used terms "axial" and "radial" relate to the longitudinal axis of the main body.

The used terms "radially extending" and "extends radially" relate to a situation in which an item extends in a direction away from the longitudinal axis.

In an embodiment of the pipe end protector according to the invention, the lip comprises an annular outer lip surface and the axial lip seal is configured to hold the outer lip surface in contact with the pipe end when (in use) the final make-up position of the pipe end protector on the pipe end is reached.

In an embodiment of the pipe end protector according to the invention, the axial lip seal is configured to apply a lip force on the pipe end with the outer lip surface when (in use) the final make-up position of the pipe end protector on the pipe end is reached.

In an embodiment of the pipe end protector according to the invention, the lip force applied on the pipe end has an axial force component and a radial force component.

In an embodiment of the pipe end protector according to the invention, the lip force is created by the stiffness of the axial lip seal.

In an embodiment of the pipe end protector according to the invention, the lip is free from contact with the main body when (in use) the final make-up position of the pipe end protector on the pipe end is reached and the lip force is created only by the stiffness of the axial lip seal.

In an embodiment of the pipe end protector according to the invention, the main body comprises an annular body contact surface located between the lip and the longitudinal axis and the axial lip seal is configured to be in contact with the body contact surface when (in use) the final make-up position of the pipe end protector on the female pipe end is reached. More specifically, the lip of the axial lip seal is in contact with the body contact surface of the main body when (in use) the final make-up position of the pipe end protector on the female pipe end is reached. This way, the annular body contact surface assists in the creation of the lip force.

In an embodiment of the pipe end protector according to the invention, the main body comprises an annular body contact surface, the lip is located between the body contact surface and the longitudinal axis and the axial lip seal is configured to be in contact with the body contact surface when (in use) the final make-up position of the pipe end protector on the male pipe end is reached. More specifically, the lip is in contact with the body contact surface of the main body when (in use) the final make-up position of the pipe end protector on the male pipe end is reached. This way, the annular body contact surface assists in the creation of the lip force.

In an embodiment of the pipe end protector according to the invention, the free rim is in contact with the body contact surface when (in use) the final make-up position of the pipe end protector on the pipe end (more specifically the female pipe end or the male pipe end) is reached.

In an embodiment of the pipe end protector according to the invention, the lip comprises an annular inner lip surface which is in contact with the body contact surface when (in use) the final make-up position of the pipe end protector on the pipe end (more specifically the female pipe end or the male pipe end) is reached.

In an embodiment of the pipe end protector according to the invention, the body contact surface extends under and angle $\alpha$ of between, and including, 35 degrees and 55 degrees, preferably between, and including, 40 degrees and 50 degrees, relative to the longitudinal axis.

In an embodiment of the pipe end protector according to the invention, the lip comprises a first lip contact area configured to be in contact with the female pipe end when (in use) the final make-up position of the pipe end protector on the female pipe end is reached, the lip comprises a second lip contact area configured to be in contact with the body contact surface when (in use) the final make-up position of the pipe end protector on the female pipe end is reached, and the first lip contact area and the second contact area are located between the female pipe end and the longitudinal axis when (in use) the final make-up position of the pipe end protector on the female pipe end is reached.

In an embodiment of the pipe end protector according to the invention, the lip comprises a first lip contact area configured to be in contact with the male pipe end when (in use) the final make-up position of the pipe end protector on the male pipe end is reached and a second lip contact area configured to be in contact with the body contact surface when (in use) the final make-up position of the pipe end protector on the male pipe end is reached, and the male pipe end is located between the first and second lip contact areas and the longitudinal axis when (in use) the final make-up position of the pipe end protector on the male pipe end is reached.

In an embodiment of the pipe end protector according to the invention, the body contact surface is part of a circumferential surface of the tubular portion. The circumferential surface is an external circumferential surface when the pipe end protector is configured for a female pipe end. The circumferential surface is an internal circumferential surface when the pipe end protector is configured for a male pipe end.

In an embodiment of the pipe end protector according to the invention, the first lip contact area is located at the outer lip surface and the second lip contact area is located at the inner lip surface.

In an embodiment of the pipe end protector according to the invention, the axial lip seal is configured to (in use) first create contact between the free rim and the female nose surface of the female pipe end during the rotational make-up of the pipe end protector on the female pipe end and to subsequently move the free rim along the female nose surface and towards the longitudinal axis when the rotational make-up is continued.

In an embodiment of the pipe end protector according to the invention, the axial lip seal is configured to first create contact between the free rim and the male nose surface of the male pipe end during the rotational make-up of the pipe end protector on the male pipe end and to subsequently move the free rim along the male nose surface and away from the longitudinal axis when the rotational make-up is continued In an embodiment of the pipe end protector according to the invention, the axial lip seal is to configured to move the free rim along the female nose surface extending under an angle $\beta$ of between, and including, 70 degrees and 90 degrees, preferably between, and including, 80 degrees and 90 degrees, relative to the longitudinal axis.

In an embodiment of the pipe end protector according to the invention, the axial lip seal is to configured to move the free rim along the male nose surface extending under an angle $\beta$ of between, and including, 70 degrees and 90 degrees, preferably between, and including, 80 degrees and 90 degrees.

In an embodiment of the pipe end protector according to the invention, the axial lip seal is configured to be in contact with an inner edge of the female pipe end when (in use) the final make-up position of the pipe end protector on the female pipe end is reached.

In an embodiment of the pipe end protector according to the invention, the axial lip seal is configured to be in contact with an outer edge of the male pipe end when (in use) the final make-up position of the pipe end protector on the male pipe end is reached In an embodiment of the pipe end protector according to the invention, the axial lip seal is configured to be in contact with an inner edge of the female pipe end when (in use) the final make-up position of the pipe end protector on the female pipe end is reached and the inner edge is located between the female nose surface and the longitudinal axis.

In an embodiment of the pipe end protector according to the invention, the axial lip seal is configured to be in contact with an outer edge of the male pipe end when the final make-up position of the pipe end protector on the male pipe end is reached and the male nose surface is located between the outer edge and the longitudinal axis.

In an embodiment of the pipe end protector according to the invention, the axial lip seal is configured to have an annular line contact surrounding the longitudinal axis with the pipe end (more specifically the female pipe end or the male pipe end) when (in use) the final make-up position of the pipe end protector on the pipe end is reached.

In an embodiment of the pipe end protector according to the invention, the axial lip seal is configured to have an annular line contact surrounding the longitudinal axis with the inner edge of the female pipe end when (in use) the final make-up position of the pipe end protector on the female pipe end is reached.

In an embodiment of the pipe end protector according to the invention, the axial lip seal is configured to have an annular line contact surrounding the longitudinal axis with the outer edge of the male pipe end when (in use) the final make-up position of the pipe end protector on the male pipe end is reached.

In an embodiment of the pipe end protector according to the invention, the free rim is directed towards the longitudinal axis when the axial lip seal is free from forces applied by the female pipe end.

In an embodiment of the pipe end protector according to the invention, the lip extends at the free rim towards the longitudinal axis when the axial lip seal is free from forces applied by the female pipe end.

In an embodiment of the pipe end protector according to the invention, the free rim is in radial direction located closer to the longitudinal axis than the lip base portion when the axial lip seal is free from forces applied by the female pipe end.

In an embodiment of the pipe end protector according to the invention, the free rim is directed towards the tubular portion when the axial lip seal is free from forces applied by the female pipe end.

In an embodiment of the pipe end protector according to the invention, the lip extends at the free rim towards the tubular portion when the axial lip seal is free from forces applied by the female pipe end. In an embodiment of the pipe end protector according to the invention, the tubular portion is in radial direction located between the longitudinal axis and the axial lip seal. This applies to the situation in which the pipe end protector is configured for a female pipe end.

In an embodiment of the pipe end protector according to the invention, the lip of the axial lip seal is configured to be bent towards the tubular portion by the female nose surface of the female pipe end when the support portion and the female pipe end are moved axially towards each other during rotational make-up of the pipe end protector on the female pipe end.

In an embodiment of the pipe end protector according to the invention, the free rim is directed towards the protector threads when the axial lip seal is free from forces applied by the female pipe end.

In an embodiment of the pipe end protector according to the invention, the lip extends at the free rim towards the protector threads when the axial lip seal is free from forces applied by the female pipe end.

In an embodiment of the pipe end protector according to the invention, the pipe end protector is configured to during make-up of the pipe end protector on the female pipe end axially move at least part of the protector threads along the female nose surface before the lip of the axial lip seal is bent towards the longitudinal axis by the female nose surface of the female pipe end.

In an embodiment of the pipe end protector according to the invention, the free rim is directed away from the longitudinal axis when the axial lip seal is free from forces applied by the male pipe end.

In an embodiment of the pipe end protector according to the invention, the lip extends at the free rim away from the longitudinal axis when the axial lip seal is free from forces applied by the male pipe end. In an embodiment of the pipe end protector according to the invention, the free rim is in radial direction located further away from the longitudinal axis than the lip base portion when the axial lip seal is free from forces applied by the male pipe end.

In an embodiment of the pipe end protector according to the invention, the free rim is directed towards the tubular portion when the axial lip seal is free from forces applied by the male pipe end.

In an embodiment of the pipe end protector according to the invention, the lip extends at the free rim towards the tubular portion when the axial lip seal is free from forces applied by the male pipe end.

In an embodiment of the pipe end protector according to the invention, the axial lip seal is in radial direction located between the longitudinal axis and the tubular portion. This applies to the situation in which the pipe end protector is configured for a male pipe end.

In an embodiment of the pipe end protector according to the invention, the lip of the axial lip seal is configured to be bent towards the tubular portion by the male nose surface of the male pipe end when the support portion and the male pipe end are moved axially towards each other during rotational make-up of the pipe end protector on the male pipe end.

In an embodiment of the pipe end protector according to the invention, the free rim is directed towards the protector threads when the axial lip seal is free from forces applied by the male pipe end.

In an embodiment of the pipe end protector according to the invention, the lip extends at the free rim towards the protector threads when the axial lip seal is free from forces applied by the male pipe end.

In an embodiment of the pipe end protector according to the invention, the pipe end protector is configured to during make-up of the pipe end protector on the male pipe end axially move at least part of the protector threads along the male nose surface before the lip is bent away from the longitudinal axis by the male nose surface of the male pipe end.

In an embodiment of the pipe end protector according to the invention, the free rim is directed towards a circumferential surface of the tubular portion when the axial lip seal is free from forces applied by the pipe end. The circumferential surface is an external circumferential surface when the pipe end protector is configured for a female pipe end. The circumferential surface is an internal circumferential surface when the pipe end protector is configured for a male pipe end.

In an embodiment of the pipe end protector according to the invention, the lip extends at the free rim towards the circumferential surface when the axial lip seal is free from forces applied by the pipe end.

In an embodiment of the pipe end protector according to the invention, the free rim is in radial direction located closer to the circumferential surface than the lip base portion when the axial lip seal is free from forces applied by the pipe end.

In an embodiment of the pipe end protector according to the invention, the lip of the axial lip seal is configured to be bent towards the external circumferential surface by the female nose surface of the female pipe end when the support portion and the female pipe end are moved axially towards each other during rotational make-up of the pipe end protector on the female pipe end.

In an embodiment of the pipe end protector according to the invention, the lip of the axial lip seal is configured to be bent towards the internal circumferential surface by the male nose surface of the male pipe end when the support portion and the male pipe end are moved axially towards each other during rotational make-up of the pipe end protector on the male pipe end.

In an embodiment of the pipe end protector according to the invention, the protector threads are provided at the circumferential surface of the tubular portion.

In an embodiment of the pipe end protector according to the invention, the axial lip seal is configured to extend from the seal support surface over a first axial lip seal distance $XL1$ when the axial lip seal is free from forces applied by the pipe end (more specifically the female pipe end or the male pipe end) and to extends from the seal support surface over a second axial lip seal distance $XL2$ being smaller than the first axial lip seal distance $XL1$ when (in use) the final make-up position of the pipe end protector on the pipe end is reached.

In an embodiment of the pipe end protector according to the invention, in the final make-up position, the pipe end (more specifically the female pipe end or the male pipe end) is located at an axial pipe distance $XP$ from the seal support surface and the axial pipe end distance $XP$ is smaller than the first axial lip distance $XL1$.

In an embodiment of the pipe end protector according to the invention, the seal support surface extends at least partly radially from a circumferential surface of the tubular portion. The circumferential surface is an external circumferential surface when the pipe end protector is configured for a female pipe end. The circumferential surface is an internal circumferential surface when the pipe end protector is configured for a male pipe end.

In an embodiment of the pipe end protector according to the invention, the axial lip seal is an external lip seal for the female pipe end.

In an embodiment of the pipe end protector according to the invention, the axial lip seal is an internal lip seal for the male pipe end.

In an embodiment of the pipe end protector according to the invention, the axial lip seal is a single piece made by overmoulding.

In an embodiment of the pipe end protector according to the invention, the protector threads (and the pipe threads) are wedge threads.

In an embodiment of the pipe end protector according to the invention, the protector threads (and the pipe threads) are free running threads.

In an embodiment of the pipe end protector, the first polymeric material and the second polymeric material are selected to adhesively attach to each other by overmoulding. In an embodiment of the pipe end protector according to the invention, the adhesive attachment is caused by chemical, dispersive and/or diffusive adhesion of the first polymeric material and the second polymeric material created by overmoulding.

In an embodiment of the pipe end protector according to the invention, the first polymeric material of the main body is a polyolefin, preferable polyethylene, and the second polymeric material of the lip seal is an elastomer, preferably an olefin block copolymer, more preferably a block copolymer of blocks of polyethylene alternating with blocks of ethylene/octene copolymer.

In an embodiment of the pipe end protector according to the invention, the main body comprises a further support portion having an at least partly radially extending annular further seal support surface,
the pipe end protector comprises an annular flexible further lip seal provided on the further seal support surface, the further lip seal is made from a third polymeric material having a third elastic modulus which is lower than the first elastic modulus, and the further lip seal comprises an annular further lip base portion which extends radially along at least part of the further seal support surface and is attached to the further seal support surface by overmoulding.

In an embodiment of the pipe end protector according to the invention, the protector threads are in axial direction located between the axial lip seal and the further lip seal.

In an embodiment of the pipe end protector according to the invention, the protector threads are in axial direction located between the seal support surface and the further seal support surface.

In an embodiment of the pipe end protector according to the invention, the axial lip seal is, in axial direction, located further away from the further lip seal, than from the protector threads.

In an embodiment of the pipe end protector according to the invention, the further lip seal is an internal lip seal for the female pipe end.

In an embodiment of the pipe end protector according to the invention, the further lip seal is an external lip seal for the male pipe end.

In an embodiment of the pipe end protector according to the invention, the further lip seal comprises an annular further lip which extends from a foot of the further lip being attached to the further lip base portion to a further free rim of the further lip being axially spaced from the further lip base portion, and wherein the foot and the further free rim are radially offset.

In an embodiment of the pipe end protector according to the invention, the further lip seal is an further axial lip seal,
the further axial lip seal comprises an annular support base portion which extends radially along at least part of the further seal support surface and is attached to the further seal support surface by overmoulding, the support base portion comprises an annular base contact surface configured to, in use, contact an annular lip contact surface of the further lip, the further lip base portion and the support base portion are radially spaced from each other, and the further lip and the support base portion are axially spaced from each other.

In an embodiment of the pipe end protector according to the invention, the protector threads are in axial direction located between the axial lip seal and the further axial lip seal.

In an embodiment of the pipe end protector according to the invention, the further axial lip seal comprises an annular seal opening located between the lip contact surface and the base contact surface, and the seal opening provides access to an annular empty space which in a cross sectional view along the longitudinal axis is surrounded by the further lip, the further lip base portion, and the support base portion.

In an embodiment of the pipe end protector according to the invention, the pipe end protector comprises an air passage.

In an embodiment of the pipe end protector according to the invention, the further lip seal is a radial lip seal, and the further free rim is located further from the longitudinal axis than the further lip base portion and directed towards the longitudinal axis OR the further free rim is located closer to the longitudinal axis than the further lip base portion and directed towards the longitudinal axis.

In an embodiment of the pipe end protector according to the invention, the protector threads are in axial direction located between the axial lip seal and the radial lip seal.

In an embodiment of the pipe end protector according to the invention, the further axial lip seal is a single piece made by overmoulding.

In an embodiment of the pipe end protector according to the invention, the radial lip seal is a single piece made by overmoulding.

It will be clear to the skilled person that the pipe end protector according to the invention may comprise the features of a combination of any number of the above defined embodiments of the pipe protector according to the invention.

The invention further relates to an assembly comprising a pipe component for exploration and production of a hydrocarbon well, which pipe component has a female pipe end provided with pipe threads, and a pipe end protector according to the invention, wherein the pipe threads and the protector threads are screwed in each other and the female pipe end is located in the final make-up position and the free rim of the lip is located between the female pipe end and the longitudinal axis OR comprising a pipe component for exploration and production of a hydrocarbon well, which pipe component has a male pipe end provided with pipe threads, and a pipe end protector according to the invention, wherein the pipe threads and the protector threads are screwed in each other and the male pipe end is located in the final make-up position and the male pipe end is located between the free rim and the longitudinal axis.

In an embodiment of the assembly according to the invention, the lip is bent towards the longitudinal axis by the female pipe end when the support portion and the female pipe end were moved axially towards each other during rotational make-up of the pipe end protector on the female pipe.

In an embodiment of the assembly according to the invention, the lip is bent away from the longitudinal axis by the male pipe end when the support portion and the male pipe end were moved axially towards each other during rotational make-up of the pipe end protector on the male pipe.

In an embodiment of the assembly according to the invention, the pipe threads and the protector threads are wedge threads.

In an embodiment of the assembly according to the invention, the pipe threads and the protector threads are free running threads.

In an embodiment of the assembly according to the invention, the further lip of the further axial lip seal is pushed in contact with the support base portion by an axial force Fa applied by the pipe end (more specifically the female pipe end or the male pipe end).

In an embodiment of the assembly according to the invention, the further free rim of the radial lip seal is pushed radially inwards by a radial force Fr applied by the female pipe end.

In an embodiment of the assembly according to the invention, the further free rim of the radial lip seal is pushed radially outwards by a radial force Fr applied by the male pipe end.

It will be clear to the skilled person that the assembly according to the invention may comprise the features of a combination of any number of the above defined embodiments of the assembly according to the invention.

The invention further relates to a method for producing a pipe end protector for protecting pipe threads provided on a pipe end of a pipe component for exploration and production of a hydrocarbon well, said method comprising;
- injecting a first polymeric material in a main mould configured to form a main body having a first elastic modulus, a longitudinal axis, at least one support portion having an at least party radially extending annular seal support surface, and a tubular portion,
- after removing the main body from the main mould, placing an axial lip seal mould over the seal support surface, and
- injecting a second polymeric material in the axial lip seal mould which is configured to form an annular flexible axial lip seal having a second elastic modulus being lower than the first elastic modulus and comprising an annular lip base portion which extends radially along at least part of the seal support surface and is attached to the seal support surface by overmoulding and further comprising an annular lip which extends from the lip base portion to a free rim of the lip, which free rim is axially spaced from the lip base portion, and wherein;
- the pipe end protector is configured for a female pipe end and the lip is configured to be bent towards the longitudinal axis by a female nose surface of the female pipe end when the support portion and the female pipe end are moved axially towards each other during rotational make-up of the pipe end protector on the female pipe end in order to position the free rim between the female pipe end and the longitudinal axis when (in use) a final make-up position of the pipe end protector on the female pipe end is reached, OR
- the pipe end protector is configured for a male pipe end and the lip is configured to be bent away from the longitudinal axis by a male nose surface of the male pipe end when the support portion and the male pipe end are moved axially towards each other during rotational make-up of the pipe end protector on the male pipe end in order to position the male pipe end between the free rim and the longitudinal axis when (in use) a final make-up position of the pipe end protector on the male pipe end is reached.

In an embodiment of the method according to the invention, the method comprises using a threading device to form protector threads on the tubular portion, which protector threads are configured to cooperate with the pipe threads of the pipe end.

In an embodiment of the method according to the invention, the method comprises using the main mould to form protector threads on the tubular portion, which protector threads are configured to cooperate with the pipe threads of the pipe end. In an embodiment of the method, the main mould is configured to form the main body comprising a further support portion having an at least partly radially extending annular further seal support surface, and the method comprises;
    placing a further lip seal mould over the further seal support surface, and—injecting a third polymeric material in the further lip seal mould which is a further axial lip seal mould configured to form a further axial lip seal having a third elastic modulus being lower than the first elastic modulus and comprising;
    an annular further lip base portion which extends radially along at least part of the further seal support surface and is attached to the further seal support surface by over-moulding
    an annular support base portion which extends radially along at least part of the further seal support surface and is attached to the further seal support surface by over-moulding, and
    an annular base contact surface located on the support base portion and configured to, in use, contact an lip contact surface located on the lip, wherein;
    the further lip base portion and the support base portion are radially spaced from each other,
    the further lip and the support base portion are axially spaced from each other,
    the further axial lip seal comprises an annular seal opening located between the lip contact surface and the base contact surface, and
    the seal opening provides access to an annular empty space which in a cross section view along the longitudinal axis is surrounded by the further lip, the further lip base portion, and the support base portion,
    the further axial lip seal mould comprises an annular space mould portion configured to form the empty space of the further axial lip seal, and
    the method comprises removing the annular space mould portion via the seal opening of the further axial lip seal after the third polymeric material has been injected in the further axial lip seal mould.

In an embodiment of the method according to the invention, the main mould is configured to form the main body comprising a further support portion having an at least partly radially extending annular further seal support surface, and the method comprises;
    placing a further lip seal mould over the further seal support surface, and—injecting a third polymeric material in the further lip seal mould which is a radial lip seal mould configured to form a radial lip seal having a third elastic modulus being lower than the first elastic modulus and wherein the further free rim is located further from the longitudinal axis than the further lip base portion and directed away from the longitudinal axis.

It will be clear to the skilled person that the method according to the invention may comprise the features of the combination of any number of the above defined embodiments of the method according to the invention.

BRIEF DESCRIPTION OF THE INVENTION

Figure 1C:
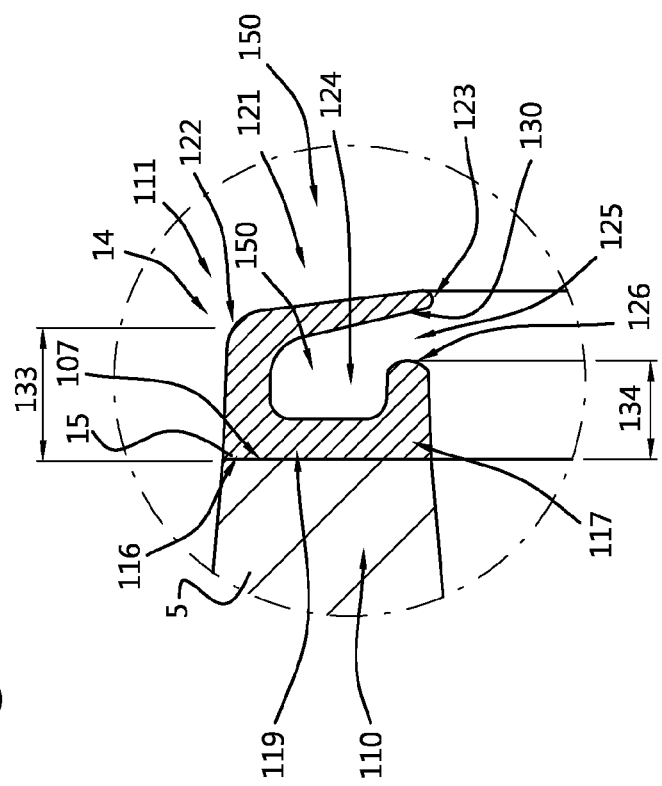
Figure 1B:
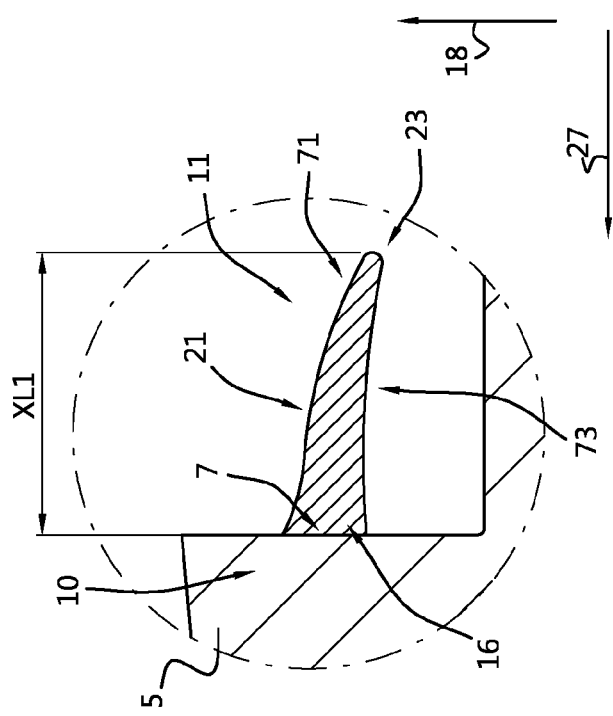
Figure 1E:
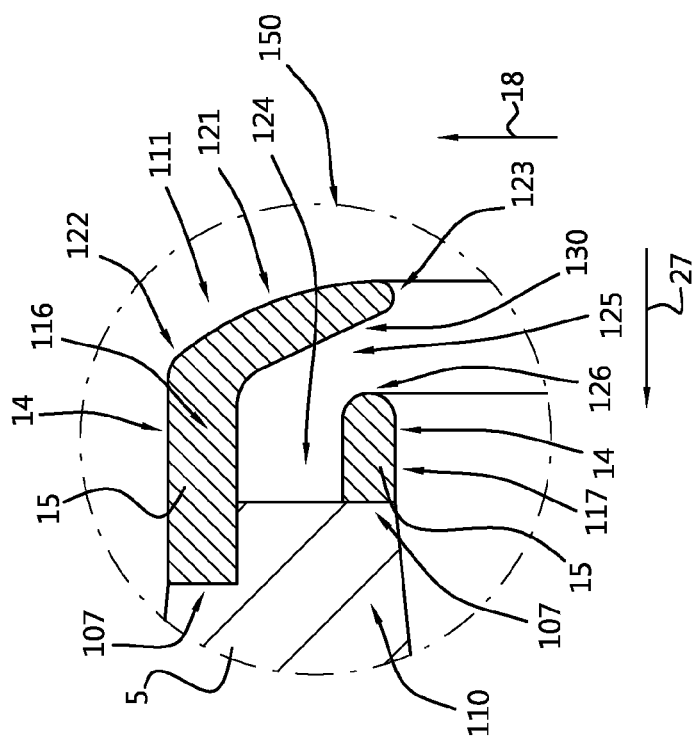
Figure 1D:
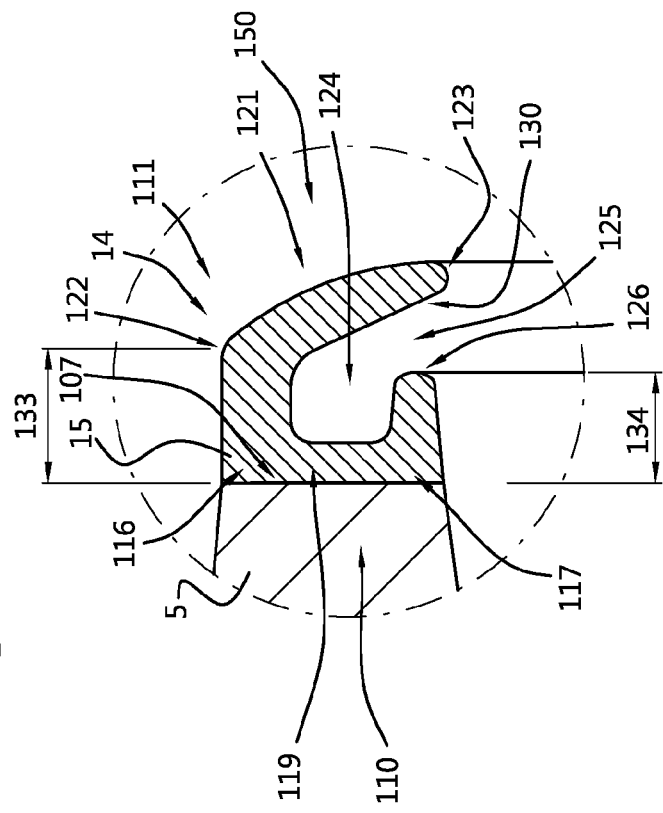
Figure 3C:
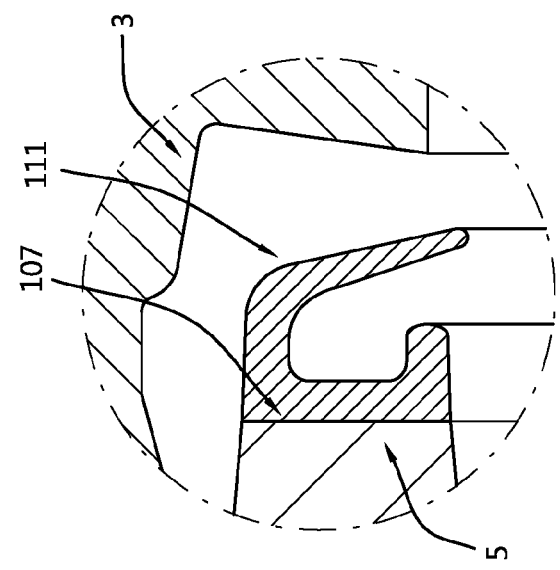
Figure 3B:
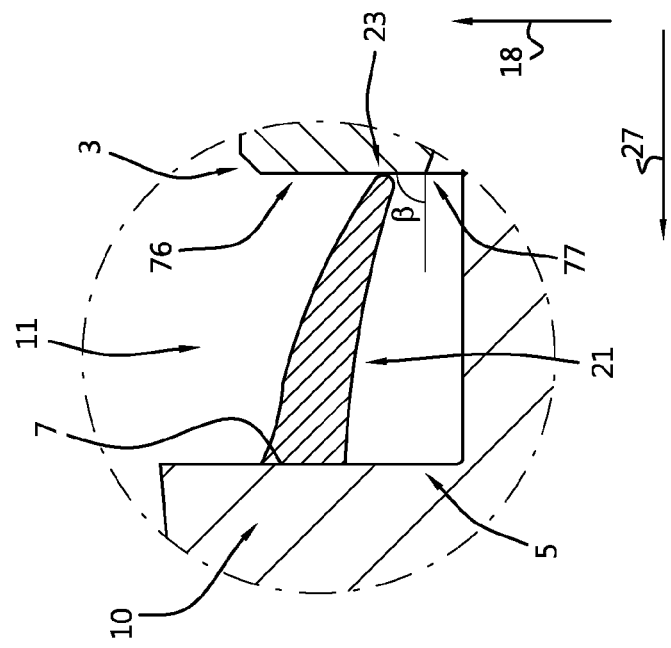
Figure 4C:
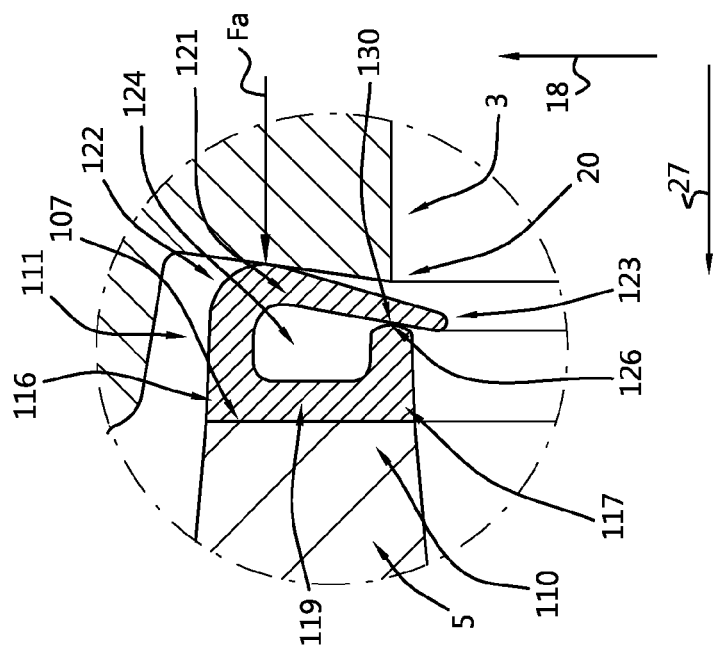
Figure 4B:
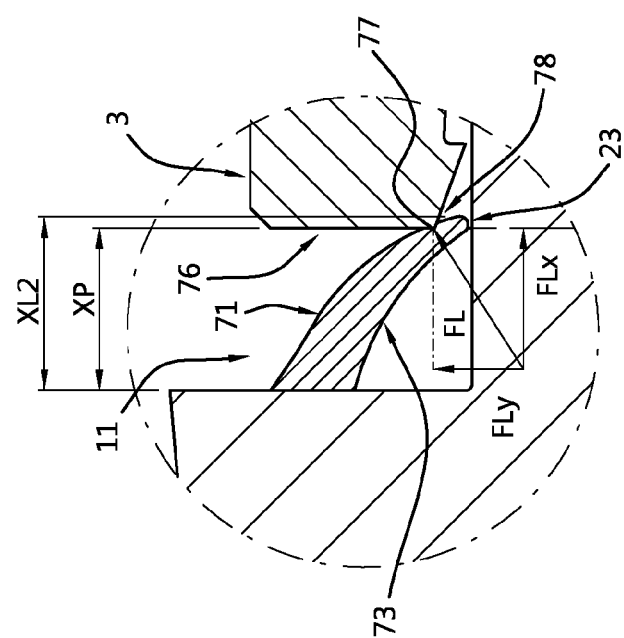
Figure 5A:
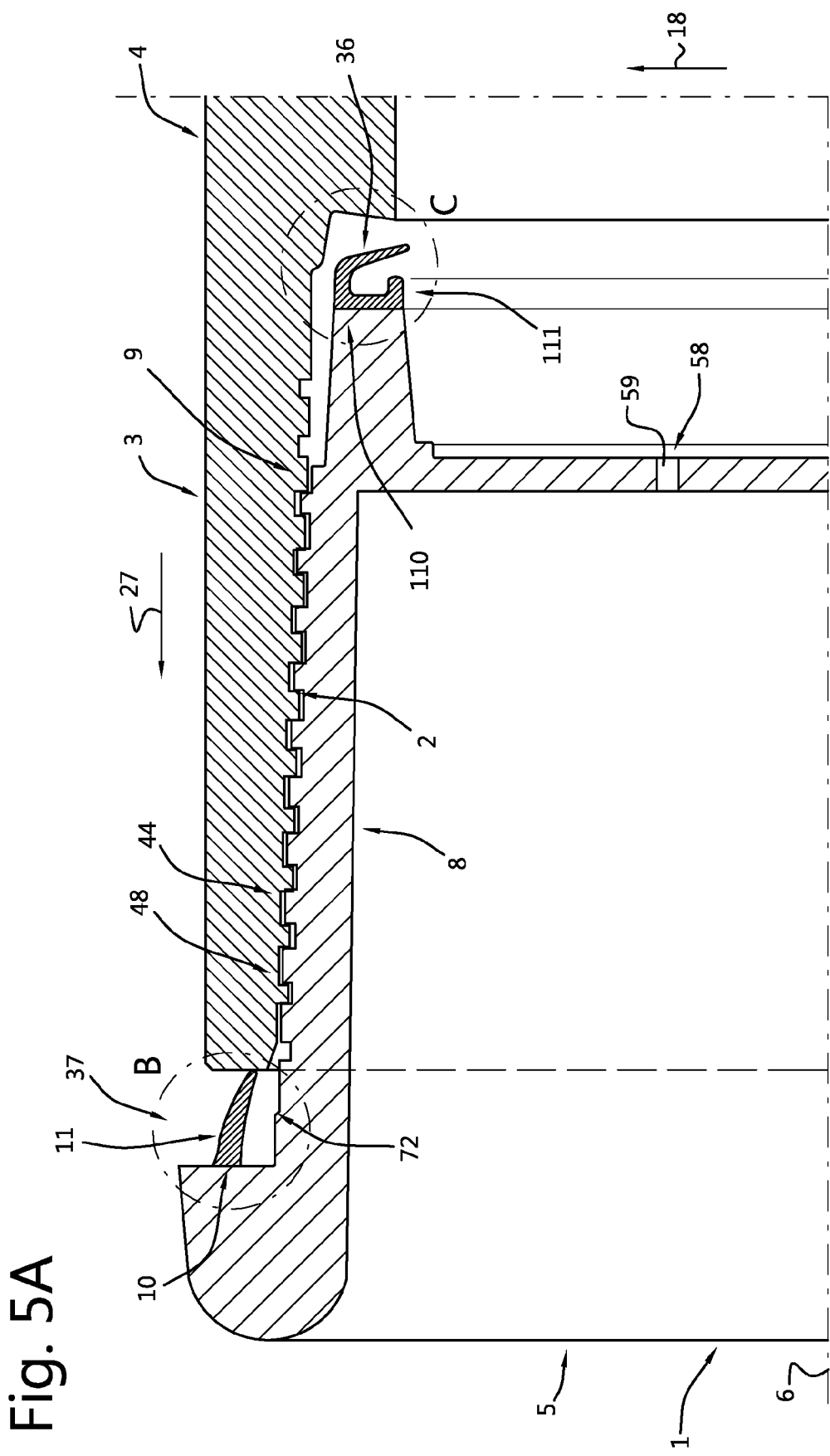
Figure 6A:
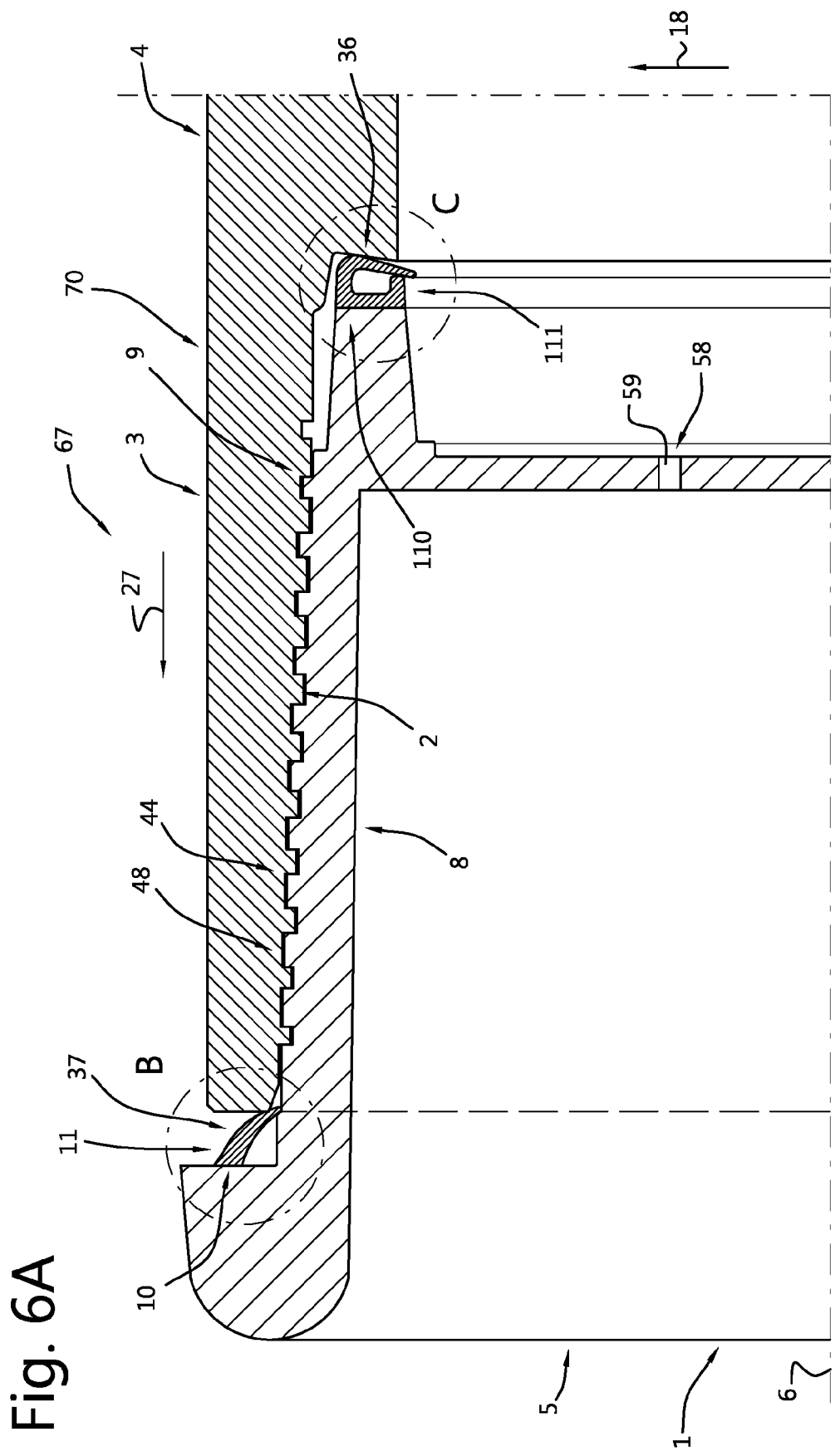
Figure 6C:
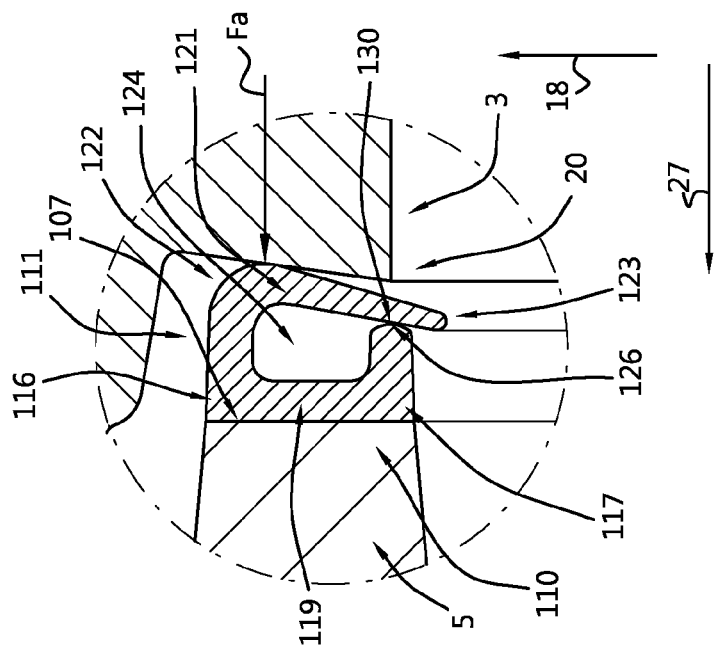
Figure 6B:
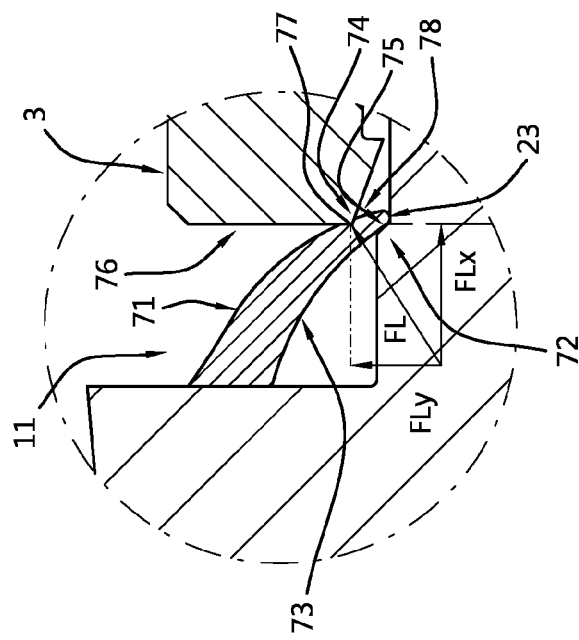
Figure 8B:
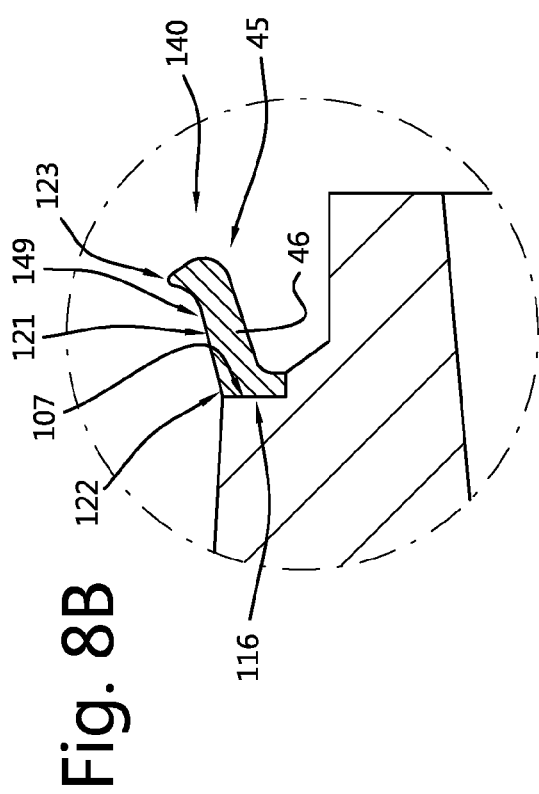
Figure 9:
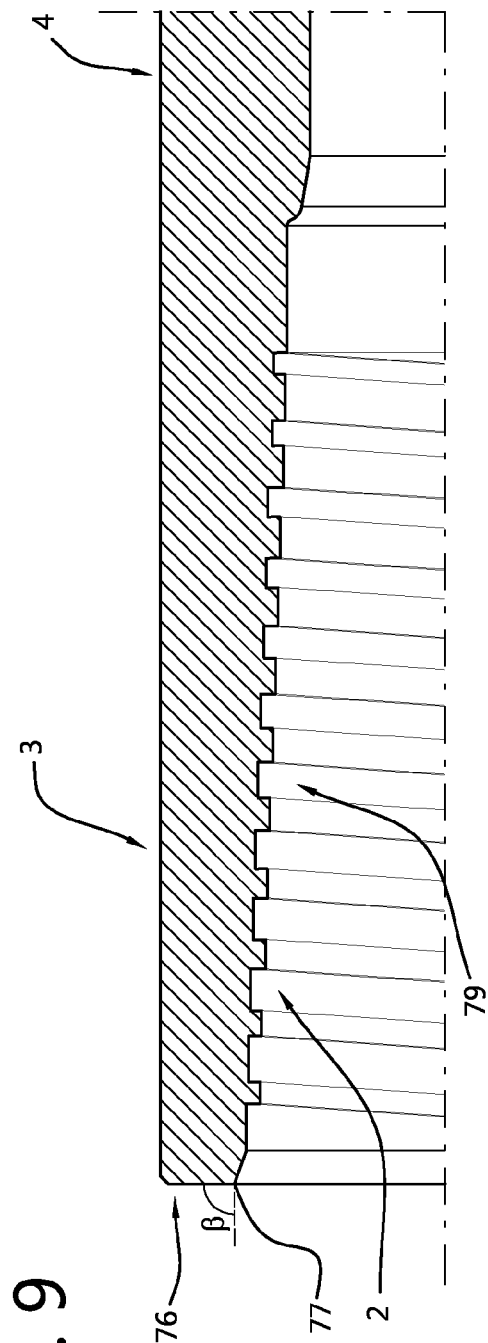
Figure 10:
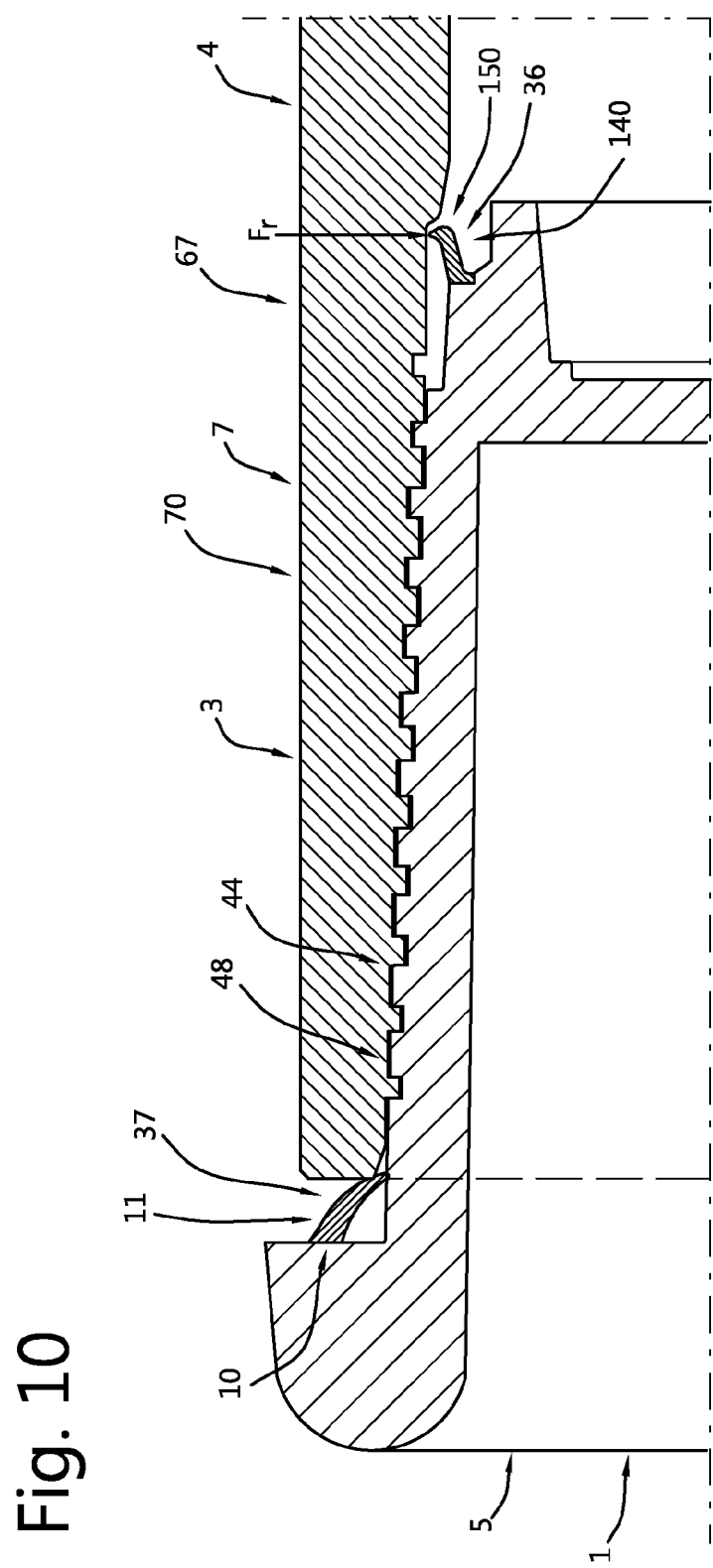
Figure 11A:
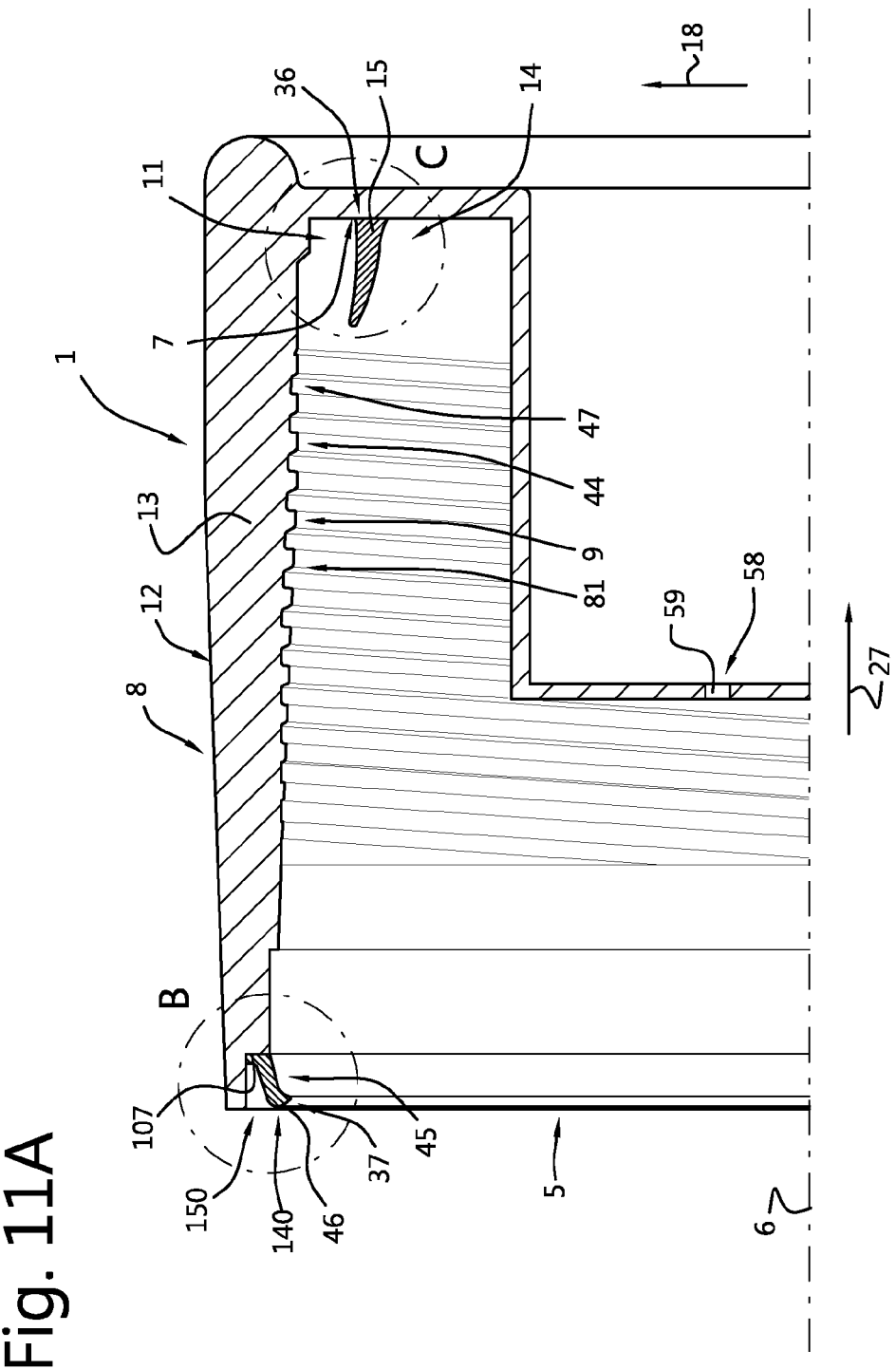
Figure 11C:
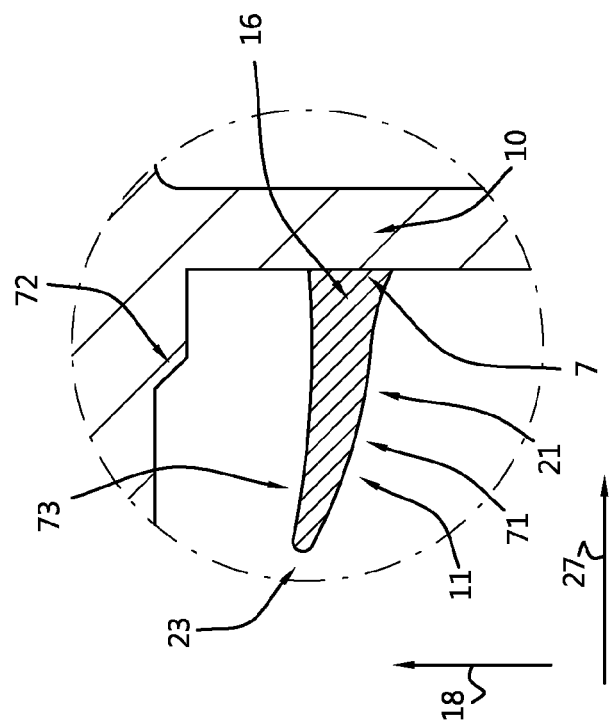
Figure 11B:
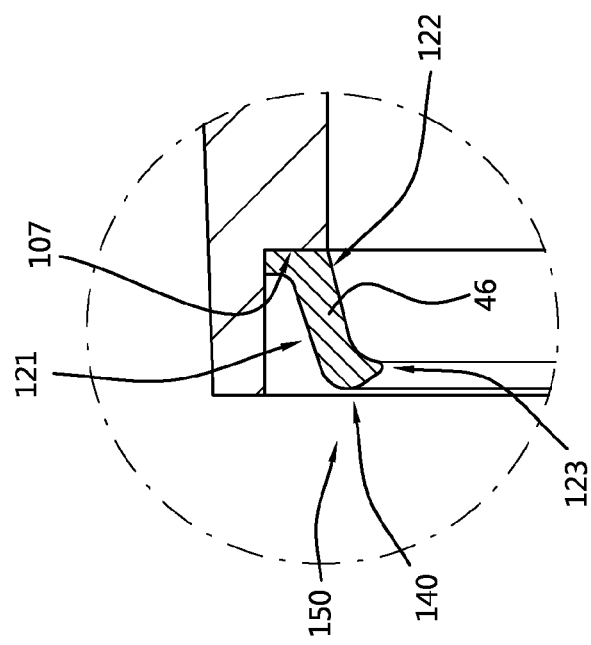
Figure 12:
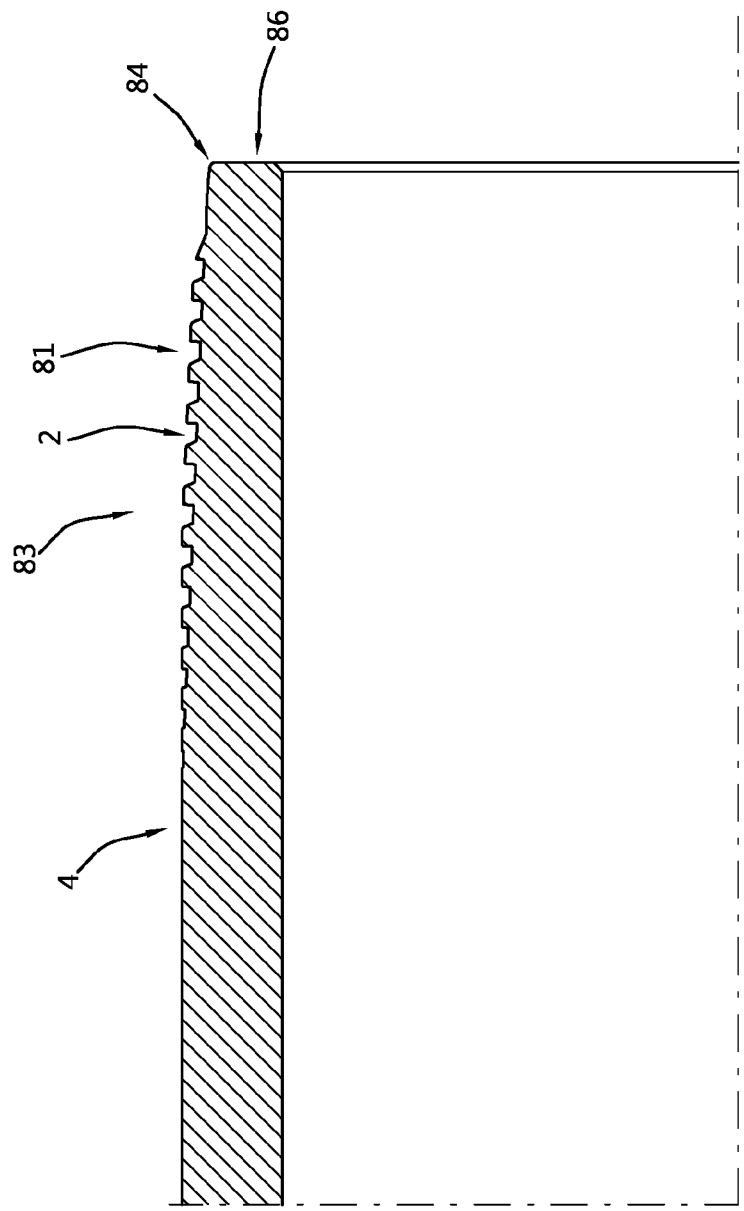
Figure 13B:
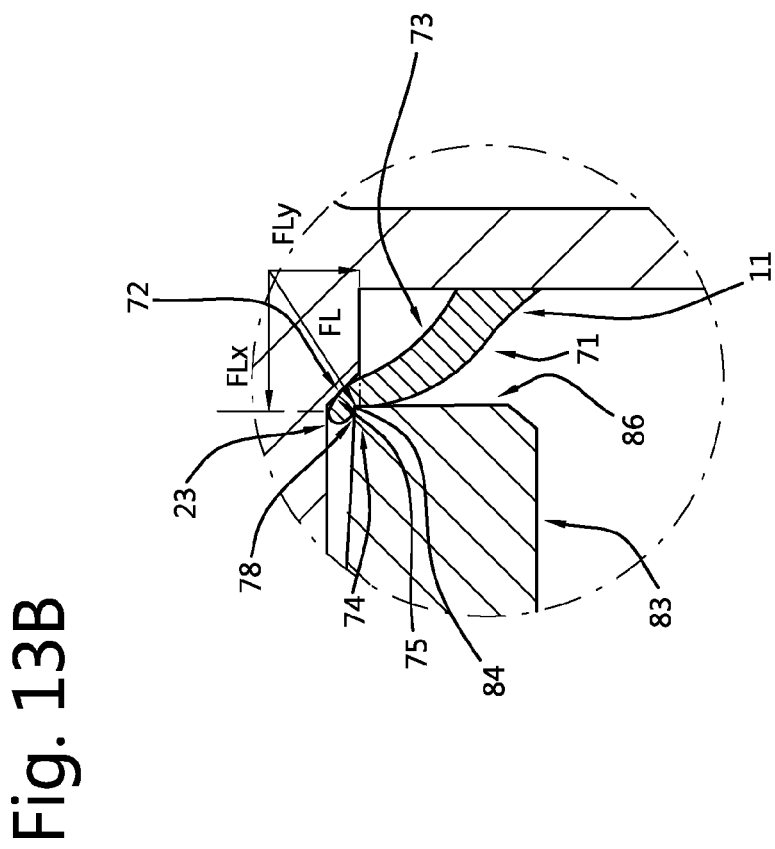

Embodiments of the pipe end protector, the assembly and the method according to the invention will be described by way of example only, with reference to the accompanying schematic drawings in which corresponding reference symbols indicate corresponding parts, and in which:
    FIG. 1A schematically shows a cross sectional view of a first embodiment of the pipe end protector according to the invention,
    FIG. 1B schematically shows an enlarged view of part B of FIG. 1A,
    FIG. 1C schematically shows an enlarged view of part C of FIG. 1A,
    FIG. 1D schematically shows an enlarged view of an alternative embodiment of part C of FIG. 1A,
    FIG. 1E schematically shows an enlarged view of another alternative embodiment of part C of FIG. 1A,
    FIG. 2 schematically shows a cross sectional view of an embodiment of a female pipe end of a pipe component for the pipe end protector of FIG. 1A,
    FIG. 3A schematically shows a cross sectional view of the pipe end protector of FIG. 1A and the female pipe end of FIG. 2 during rotational make-up,
    FIG. 3B schematically shows an enlarged view of part B of FIG. 3A,
    FIG. 3C schematically shows an enlarged view of part C of FIG. 3A,
    FIG. 4A schematically shows a cross sectional view of a first embodiment of an assembly according to the invention and comprising the pipe end protector and the female pipe end of FIG. 3A,
    FIG. 4B schematically shows an enlarged view of part B of FIG. 4A,
    FIG. 4C schematically shows an enlarged view of part C of FIG. 4A,
    FIG. 5A schematically shows a cross sectional view of a second embodiment of the pipe end protector and the female pipe end according to the invention during rotational make-up,
    FIG. 5B schematically shows an enlarged view of part B of FIG. 5A,
    FIG. 5C schematically shows an enlarged view of part C of FIG. 5A,
    FIG. 6A schematically shows a cross sectional view of a second embodiment of an assembly according to the invention and comprising the pipe end protector and the female pipe end of FIG. 5A,
    FIG. 6B schematically shows an enlarged view of part B of FIG. 6A,
    FIG. 6C schematically shows an enlarged view of part C of FIG. 6A, the FIGS. 7A-H schematically show an embodiment of the method according to the invention,
    FIG. 8A schematically shows a cross sectional view of a third embodiment of the pipe end protector according to the invention,
    FIG. 8B schematically shows an enlarged view of part B of FIG. 8A,
    FIG. 9 schematically shows a cross sectional view of an alternative embodiment of a female pipe end of a pipe component for the pipe end protector of FIG. 8A, and
    FIG. 10 schematically shows a cross sectional view of a third embodiment of an assembly according to the invention and comprising the pipe end protector of FIG. 8A and the female pipe end of FIG. 9,
    FIG. 11A schematically shows a cross sectional view of a fourth embodiment of the pipe end protector according to the invention,
    FIG. 11B schematically shows an enlarged view of part B of FIG. 11A,
    FIG. 11C schematically shows an enlarged view of part C of FIG. 11A,
    FIG. 12 schematically shows a cross sectional view of an embodiment of a male pipe end of a pipe component for the pipe end protector of FIG. 11A, and
    FIG. 13A schematically shows a cross sectional view of a fourth embodiment of an assembly according to the invention and comprising the pipe end protector of FIG. 11A and the male pipe end of FIG. 12, and FIG. 13B schematically shows an enlarged view of part B of FIG. 13A.

DETAILED DESCRIPTION OF THE INVENTION

FIG. 1A shows a cross sectional view of a first embodiment of the pipe end protector 1 according to the invention. The pipe end protector 1 is configured to be screwed on the female pipe end 3 of the pipe component 4 of FIG. 2. Only the upper half of the pipe end protector 1 is shown, but it will be clear to the skilled person that the pipe end protector 1 is radial symmetric. This also applies to the other figures in which only an upper half is shown. The FIGS. 1B and 1C show enlarged views of the part B and C of FIG. 1A, respectively.

The pipe end protector 1 is configured to protect pipe threads 2 provided on a female pipe end 3 of a pipe component 4 for exploration and production of a hydrocarbon well. The pipe end protector 1 comprises a main body 5 having a longitudinal axis 6, a support portion 10 having an at least partly radially extending annular seal support surface 7, and a tubular portion 8 provided with protector threads 9 configured to cooperate with the pipe threads 2 of the pipe end 3 (see the FIGS. 3A and 4A). An annular flexible axial lip seal 11 is provided on the seal support surface 7. As will be explained in detail, the pipe end protector 1 also comprises a further lip seal 150 being a further axial lip seal 111. The further lip seal 150 is provided on an at least partly radially extending annular further seal support surface 107 of a further support portion 110. The axial lip seal 11 is an external lip seal 36. The further lip seal 150 is an internal lip seal 37. The pipe threads 2 and the protector threads 9 are wedge threads 79. In another example, the pipe threads 2 and the protector threads 9 are free running threads.

The used terms "axial" and "radial" relate to the longitudinal axis 6 of the main body 5.

The used terms "radially extending" and "extends radially" refer to a situation in which an item extends away from the longitudinal axis.

For example, the at least partly radially extending annular seal support surface 7 of the embodiment of the pipe end protector 1 of FIG. 1 extends substantially perpendicular to the longitudinal axis 6. In other embodiments of the pipe end protector 1 according to the invention, the seal support surface 7 is at least partly extending under an angle smaller than 90 degrees relative to the longitudinal axis 6. This applies amongst others in a similar manner to the at least partly radially extending annular further seal support surface 107 on which the further lip seal 150 is provided.

The term "annular" as used herein refers to an item having a ring-like configuration.

Merely as an example, it will be clear to the skilled person that the at least partly radially extending annular seal support surface 7 may have a part which extends in axial direction. This may be similar to the situations shown in the FIGS. 8B and 11B in which the at least partly radially extending annular further seal support surface 107 have a part extending in axial direction.

The main body 5 is made from a first polymeric material 12 having a first elastic modulus 13. The axial lip seal 11 is made from a second polymeric material 14 having a second elastic modulus 15 which is lower than the first elastic modulus 13.

The axial lip seal 11 comprises an annular lip base portion 16 which extends radially along at least part of the seal support surface 7 and is attached to the seal support surface 7 by overmoulding. The axial lip seal 11 comprises an annular lip 21 which extends from the lip base portion 16 to a free rim 23 of the lip 21, which free rim 23 is axially spaced from the lip base portion 16. The lip 21 is configured to be bent towards the longitudinal axis 6 by the female pipe end 3 when the support portion 10 and the female pipe end 3 are moved axially towards each other during rotational make-up of the pipe end protector 1 on the female pipe end 3 in order to position the free rim 23 between the female free end 3 and the longitudinal axis 6 when (in use) a final make-up position 70 of the pipe end protector 1 on the female pipe end 3 is reached (see FIG. 4A). The term between relates to the situation when seen in a radial direction 18 relative to the longitudinal axis 6.

The position of the free rim 23 between the female pipe end 3 and the longitudinal axis 6 ensures that the lip 21 is pushed against the female pipe end 3 to increase the sealing effect of the axial lip seal 11.

The first polymeric material 12 of the main body 5 is a polyolefin, more specifically a polyethylene. The second polymeric material 14 of the axial lip seal 11 is an elastomer, more specifically an olefin block copolymer, even more specifically a block copolymer of blocks of polyethylene alternating with blocks of ethylene/octene copolymer.

The first polymeric material 12 and the second polymeric material 14 are selected to adhesively attach to each other by overmoulding. Adhesive attachment between the axial lip seal 11 and the seal support surface 7 of the main body 5 is caused by chemical, dispersive and/or diffusive adhesion of the first polymeric material 12 and the second polymeric material 14 created by overmoulding.

Chemical adhesion occurs when surface atoms of a material form ionic, covalent or hydrogen bonds with surface atoms of another material. In dispersive adhesion two materials are held together by van der Waals forces. Diffusive adhesion occurs with polymer chains where an end of a molecule of a polymeric material has diffused into another polymeric material. When both polymeric materials are crystalline, cocrystallization of polymer chains may occur. Preferably the adhesive attachment is caused by diffusive adhesion of polymer chains, optionally including cocrystallization.

The axial lip seal 11 will remain at its position on the seal support surface 7 when the pipe end protector 1 is re-used, because the axial lip seal 11 is attached to the seal support surface 7 by overmoulding. As a result, the sealing capacity of the pipe end protector 1 will reduce less when it is re-used. The pipe end protector 1 can therefore be re-used more often.

The free rim 23 is directed towards the longitudinal axis 6 when the axial lip seal 11 is free from forces applied by the female pipe end 3. This facilitates the bending of the lip 21 towards the longitudinal axis 6 of the pipe end protector 1 when the support portion 10 and the female pipe end 3 are moved axially towards each other during rotational make-up of the pipe end protector 1 on the female pipe end 3.

The lip 21 extends at the free rim 23 towards the longitudinal axis 6 when the axial lip seal 11 is free from forces applied by the female pipe end 3.

The free rim 23 is in radial direction located closer to the longitudinal axis 6 than the lip base portion 16 when the axial lip seal 11 is free from forces applied by the female pipe end 3.

The free rim 23 is directed towards the tubular portion 8 when the axial lip seal 11 is free from forces applied by the female pipe end 3.

The lip 21 extends at the free 23 rim towards the tubular portion 8 when the axial lip seal 11 is free from forces applied by the female pipe end 3.

The tubular portion 8 is in radial direction located between the longitudinal axis 6 and the axial lip seal 11. This applies to the situation in which the pipe end protector 1 is configured for a female pipe end 3.

The lip 21 of the axial lip seal 11 is configured to be bent towards the tubular portion 8 by the female nose surface 76 of the female pipe end 3 when the support portion 10 and the female pipe end 3 are moved axially towards each other during rotational make-up of the pipe end protector 1 on the female pipe end 3.

The free rim 23 is directed towards the protector threads 9 when the axial lip seal 11 is free from forces applied by the female pipe end 3.

The lip 21 extends at the free rim 23 towards the protector threads 9 when the axial lip seal 11 is free from forces applied by the female pipe end 3.

The pipe end protector 1 is configured to during make-up of the pipe end protector 1 on the female pipe end 3 axially move at least part of the protector threads 9 along the female nose surface 76 before the lip 21 of the axial lip seal 11 is bent towards the longitudinal axis 6 by the female nose surface 76 of the female pipe end 3.

The free rim 23 is directed towards a circumferential surface 44 of the tubular portion 8 when the axial lip seal 11 is free from forces applied by the female pipe end 3. The circumferential surface 44 is an external circumferential surface 48.

The protector threads 9 are provided at the external circumferential surface 48 of the tubular portion 8.

The lip 21 extends at the free rim 23 towards the external circumferential surface 48 when the axial lip seal 11 is free from forces applied by the female pipe end 3.

The free rim 23 is in radial direction located closer to the external circumferential surface 48 than the lip base portion 16 when the axial lip seal 11 is free from forces applied by the female pipe end 3.

The seal support surface 7 extends at least partly radially from the external circumferential surface 48 of the tubular portion 8.

The lip 21 of the axial lip seal 11 is configured to be bent towards the external circumferential surface 48 by the female nose surface 76 of the female pipe end 3 when the support portion and the female pipe end 3 are moved axially towards each other during rotational make-up of the pipe end protector 1 on the female pipe end 3.

The axial lip seal 11 is configured to extend from the seal support surface 7 over a first axial lip seal distance XL1 when the axial lip seal 11 is free from forces applied by the female pipe end 3.

The further axial lip seal 111 comprises a further annular lip base portion 116 which extends radially along at least part of the further seal support surface 107 and is attached to a further seal support surface 107 by overmoulding. The further axial lip seal 111 comprises a further annular lip 121 which extends from a foot 122 of the further lip 121 being attached to the further lip base portion 116 to a further free rim 123 of the further lip 121 being axially spaced from the further lip base portion 116 in an axially non-compressed condition. The foot 122 and the further free rim 123 are radially offset.

The further axial lip seal 111 comprises an annular support base portion 117 which extends radially along at least part of the further seal support surface 107 and is attached to the seal support surface 107 by overmoulding. The support base portion 117 comprises an annular base contact surface 126 configured to, in use, contact an annular lip contact surface 130 of the further lip 121. The further lip base portion 116 and the support base portion 117 are radially spaced from each other. The further lip 121 and the support base portion 117 are axially spaced from each other. As a result of this, the lip contact surface 130 and the base contact surface 126 are axially space from each other.

The further axial lip seal 111 comprises an annular intermediate base portion 119 which extends radially along at least part of the further seal support surface 107 and is attached to the further seal support surface 107 by overmoulding. The intermediate base portion 119 interconnects the further lip base portion 116 and the support base portion 117. The further axial lip seal 111 is a single piece made by injection overmoulding.

The further axial lip seal 111 comprises an annular seal opening 125 located between the lip contact surface 130 and the base contact surface 126. The seal opening 125 provides access to an annular empty space 124 which in a cross sectional view along the longitudinal axis 6 is surrounded by the further lip 121, the further lip base portion 116, and the support base portion 117.

Since the axial lip seal 11 and the further axial lip seal 111 are overmoulded onto the main body 5, the pipe end protector 1 can be produced in a more efficient manner with less or no manual labour. This reduces the production costs of the pipe end protector 1. Overmoulding is a production process in which an item is (injection) moulded over (part of) another item.

The axial lip seal 11 and the further axial lip seal 111 with its empty space 124 both have a slender form which is very suitable for overmoulding. This allow that the axial lip seal 11 and the further axial lip seal 111 can be overmoulded in an efficient and reliable manner.

The protector threads 9 are in axial direction 27 located between the axial lip seal 11 and the further axial lip seal 111.

The protector threads are in axial direction 27 located between the seal support surface 7 and the further seal support surface 107.

The axial lip seal 11 is, in axial direction, located further away from the further axial lip seal 111, than from the protector threads 9.

The pipe end protector 1 comprises an air passage 58 located closer to the longitudinal axis 6 than the internal lip seal 36 when seen in a radial direction 18. The air passage 58 avoids that an over pressure is formed in the pipe component 4 when pipe end protectors 1 are placed at both pipe ends 3. The air passage 58 is a through hole 59.

The further lip base portion 116 protrudes away from the further seal support surface 107 to position the foot 122 of the further lip 121 at a foot distance 133 from the further seal support surface 107 in the axial direction 18. The support base portion 117 protrudes away from the further seal support surface 107 to position the base contact surface 126 at a support distance 134 from the further seal support surface 107 in the axial direction 18.

The seal opening 125 surrounds, in a cross section view along the longitudinal axis 6, less than 30%, preferably less than 20%, more preferably less than 10%, of the empty space 124.

The seal opening 125 allows that the empty space 124 is formed by an annular space mould portion 155 of an further axial seal mould 153 configured to form the further axial lip seal 111 by overmoulding (see FIG. 7G).

The seal opening 125 is the only access to the empty space 124. The further lip 121 extending from the foot 122 until the further free rim 123 is directing towards the longitudinal axis 6. The support base portion 117 is located closer to the longitudinal axis 6 than the further lip base portion 116.

The further axial lip seal 111 is made from a third polymeric material 45 having a third elastic modulus 46 which is lower than the first elastic modulus 13 of the first polymeric material 12. The third polymeric material 45 may be the same as the second polymeric material 14 and the third elastic modulus 46 may therefore be the same as the second elastic modulus 15.

The FIGS. 1D and 1E show an enlarged view of two alternative embodiments of the further axial lip seal 111 shown in part C of FIG. 1A. The alternative further axial lip seal 111 of FIG. 1E differs in that it does not comprise an intermediate base portion 119 due to which the further lip base portion 116 and the support base portion 117 are not interconnected. The further axial lip seal 111 is made in two, and only two, pieces by injection overmoulding. The alternative main body 5 differs in that the further seal support surface 107 does not only extend in the radial direction 18, but also in the axial direction 27.

The FIGS. 1A-E show the pipe end protector 1 in an axially non-compressed condition. The FIGS. 4A-C show the pipe end protector 1 in an axially compressed condition with the pipe end protector 1 in the final make-up position 70 on the female pipe end 3.

FIG. 3A-C schematically shows the pipe end protector 1 of FIG. 1A and the female pipe end 3 of FIG. 2 during rotational make-up. The axial lip seal 11 is configured to first create contact between the free rim 23 and a female nose surface 76 of the female free end 3 during the rotational make-up of the pipe end protector 1 on the female pipe end 3 (as shown in FIG. 3A) and to subsequently move the free rim 23 along the female nose surface 76 towards the longitudinal axis 6 when the rotational make-up is continued.

The axial lip seal 11 is configured to move the free rim 23 along the female nose surface 76 extending under an angle β of about 90 degrees relative to the longitudinal axis 6 as shown in FIG. 3B. In other examples, the angle β is between, and including, 70 degrees and 90 degrees, preferably between, and including, 80 degrees and 90 degrees, relative to the longitudinal axis 6. The female nose surface 76 is oriented to facilitate the movement of, in particular by pushing, the free rim 23 towards the longitudinal axis 6.

The FIGS. 4A-C show the pipe end protector 1 in the final make-up position 70 on the female pipe end 3. The lip 21 comprises an annular outer lip surface 71 and the axial lip seal 11 is configured to hold the outer lip surface 71 in contact with the female free end 3.

The axial lip seal 11 is configured to apply a lip force FL on the female pipe end 3 with the outer lip surface 71. The lip force FL applied on the female pipe end has an axial force component FLx (which is larger than 0 Newton) and a radial force component FLr (which is larger than 0 Newton).

In FIG. 4A, the lip 21 is free from contact with the main body 5 when (in use) the final make-up position 70 of the pipe end protector 1 on the female pipe end 3 is reached and the lip force FL is only created by the stiffness of the axial lip seal 3. In another example, the lip 21, more specifically the free rim 23 of the lip 21, is in contact with the main body 5 when (in use) the final make-up position 70 of the pipe end protector 1 on the female pipe end 3 is reached. This way, an annular body contact surface 72 of the main body 5 being in contact with the lip 21 is formed. The body contact surface 72 is used to assist in the creation of the lip force FL. FIG. 6A shows a further example of using a body contact surface 72 to assist in the creation of the lip force FL. The body contact surface 72 is part of the external circumferential surface 48 of the tubular portion 8.

The axial lip seal 11 is configured to be in contact with an inner edge 77 of the female pipe end 3. The inner edge 77 is located between the female nose surface 76 and the longitudinal axis 6. The axial lip seal 11 has an annular line contact 78 surrounding the longitudinal axis 6 with the female pipe end 3, more specifically with the inner edge 77 of the female pipe end 3. The line contact 78 reduces the risk of liquid passing the axial lip seal 11 by capillary action.

The axial lip seal 11 is configured to extend in the final make-up position 70 from the seal support surface 7 over a second axial lip seal distance XL2 being smaller than the first axial lip seal distance XL1.

In the final make-up position 70, the female pipe end 3 is located at an axial pipe distance XP from the seal support surface 7 and the axial pipe end distance XP is smaller than the first axial lip distance XL1.

Now turning to the further axial lip seal 111. The further lip 121 is configured to come in contact with the base contact surface 126 when an axial force Fa is applied on the further lip 121 by the female pipe end 3, more specifically an internal shoulder 20 of the female pipe end 3.

The FIG. 5A-C show a second embodiment of the pipe end protector 1 and the female pipe end 3 according to the invention during rotational make-up. The final make-up position 70 has been reached in the FIGS. 6A-C.

The main body 5 comprises an annular body contact surface 72 located between the lip 21 and the longitudinal axis 6 and the axial lip seal 11 is configured to be in contact with the body contact surface 72 when the final make-up position 70 of the pipe end protector 1 on the female pipe end 3 is reached. The lip 21 comprises an annular inner lip surface 73 which in the final make-up position 70 is in contact with the body contact surface 72. In other examples, the free rim 23 may be in contact with the body contact surface 72 at final make-up.

The body contact surface 72 extends under an angle α of about 45 degrees relative to the longitudinal axis 6. In other examples, the angle α is about 45 degrees relative to the longitudinal axis 6. The body contact surface 72 is inclined towards the seal support surface 7 when seen in the radial direction 18.

The lip 21 comprises a first lip contact area 74 configured to be in contact with the female pipe end 3 and a second lip contact area 75 configured to be in contact with the body contact surface 72. In the final make-up position 70, the first lip contact area 74 and the second contact area 75 are located between the female pipe end 3 and the longitudinal axis 6. The first lip contact area 74 is located at the outer lip surface 71 and the second lip contact area 75 is located at the inner lip surface 73.

The FIGS. 7A-H show an embodiment of the method according to the invention. More specifically, it shows an embodiment of the method of producing the pipe end protector 1 of FIG. 1. It will be clear to the skilled person that this method can be applied in a similar manner to produce the other disclosed pipe end protectors 1.

The method of producing the pipe end protector 1 of FIG. 1 comprises the following steps.

In FIG. 7A, a main mould 52 is provided. The main mould 52 is configured to form the main body 5. A first polymeric material supply 61 is connected to the main mould 52.

In FIG. 7B, the first polymeric material 12 is injected in the main mould 52 by the first polymeric material supply 61 to form the main body 5 having its first elastic modulus 13.

In FIG. 7C, the main body 5 is removed from the main mould 52.

In the shown embodiment of the method, the main mould 52 is used to form the protector threads 9 on the tubular portion 8. The protector threads 9 are formed on the tubular portion 8 during the injection of the first polymeric material 61 in the main mould 52.

In another embodiment of the method, a threading device (not shown) is used to form the protector threads 9 on the tubular portion 8. In this embodiment, the main mould 52 does not comprise the thread mould parts 57 to form the protector threads 9. The protector threads 9 are threaded on the tubular portion 8 after the main body 5 has been removed from the main mould 52.

In FIG. 7D, an axial seal mould 53 is placed over the seal support surface 7. A second polymeric material supply 62 is connected to the axial seal mould 53.

In FIG. 7E, the second polymeric material 14 is injected in the axial seal mould 53 to form the axial lip seal 11 having its second elastic modulus 15 being lower than the first elastic modulus 13. Due to the slender form of the axial lip seal 11, the injection moulded second polymeric material 14 is able to cool relatively fast. This allows that the axial lip seal 11 can be overmoulded in a time efficient manner.

Figure 7F:
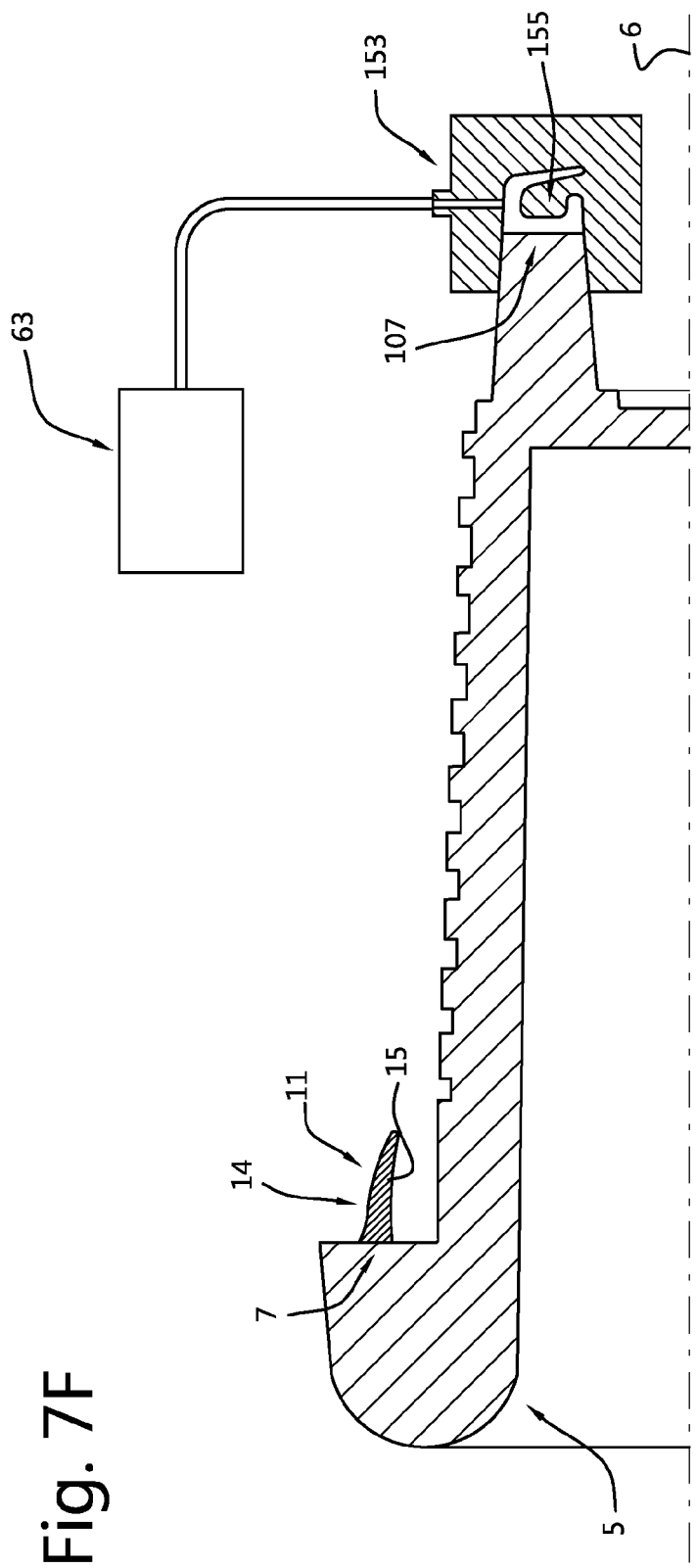

In FIG. 7F, the axial seal mould 53 has been removed. A further axial seal mould 153 is placed over the further seal support surface 107. The further axial seal mould 153 comprises a annular space mould portion 155 which will form the empty space 124 of the further axial lip seal 111. A third polymeric material supply 63 is connected to the further axial seal mould 153.

In FIG. 7G, a third polymeric material 45 is injected in the further axial seal mould 153 to form the further axial lip seal 111 having a third elastic modulus 46 being lower than the first elastic modulus 13.

Figure 7H:
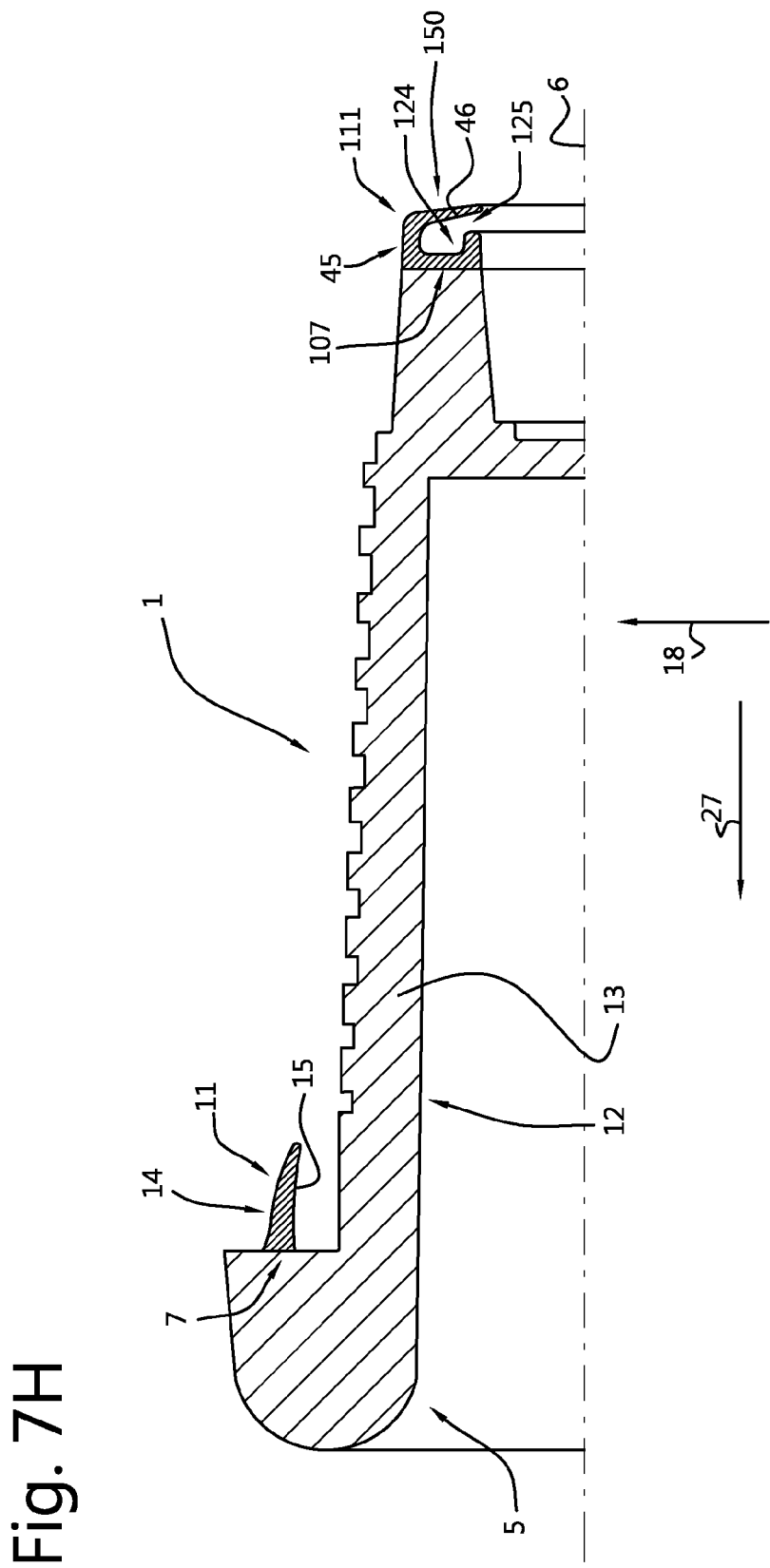

In FIG. 7H, the further axial seal mould 153 has been removed. The annular space mould portion 155 has been removed via the seal opening 125 of the further axial lip seal 111. The production process of the pipe end protector 1 has been completed.

In an example to produce a pipe end protector 1 like the embodiment of FIG. 8, a radial lip seal mould is used to overmould a radial lip seal 140 on the further seal support surface 107 of the main body 5.

The FIGS. 8A-B show a third embodiment of the pipe end protector according to the invention. The embodiment of FIG. 8 differs from the embodiment of FIG. 1 in that the further lip seal 150 is an annular flexible radial lip seal 140. The further free rim 123 of the radial lip seal 140 is located further from the longitudinal axis 6 than the further lip base portion 116. The further free rim 123 is directed away from the longitudinal axis 6. A better sealing capacity is achieved by the form of the radial lip seal 140.

In particular, the radial lip seal 140 is very suitable as an internal seal for protecting the pipe threads of a pipe end of a pipe component when the pipe end does not have an internal shoulder. In other words; the radial lip seal 140 is particularly useful for providing an internal seal between a pipe end of a pipe component and the pipe end protector in case the pipe end is free from an internal shoulder.

The radial lip seal 140 is provided on the further seal support surface 107. The radial lip seal 140 is made from the third polymeric material 45. The radial lip seal 140 forms an internal lip seal 36. The radial lip seal 140 comprises an annular further lip base portion 116 which extends radially along the further seal support surface 107 and is attached to the further seal support surface 107 by overmoulding. An annular further lip 121 extends from a foot 122 of the further lip 121 being attached to the further lip base portion 116 to the further free rim 123 which is located further from the longitudinal axis 6 than the further lip base portion 116 in a radially non-compressed condition.

The further lip 121 comprises an intermediate lip section 149 located between the foot 122 and the further free rim 123.

The radial lip seal 140 is a single piece made by injection overmoulding.

The protector threads 9 are in axial direction 27 located between the axial lip seal 11 and the radial lip seal 140.

The protector threads 9 are in axial direction 27 located between the seal support surface 7 and the further seal support surface 107.

The axial lip seal 11 is, in axial direction, located further away from the radial lip seal 140 than from the protector threads 9.

FIG. 9 shows an alternative embodiment of a female pipe end 3 of a pipe component 4 for the pipe end protector 1 of FIG. 8A. The female pipe end 3 does not comprise an internal shoulder.

FIG. 10 shows a cross sectional view of the pipe end protector of FIG. 8A located in the final make-up position 70 on the female pipe end of FIG. 9. During rotational make-up of the pipe end protector 1 on the female pipe end 3, the further free rim 123 of the radial lip seal 140 is moved radially inwards by a radial force Fr applied by the pipe end 3.

The FIGS. 11A-C show cross sectional views of a fourth embodiment of the pipe end protector according to the invention. The pipe end protector 1 is configured for the male pipe end 83 of FIG. 12. It will be clear to the skilled person that many features discussed in relation with the previous figures apply in a similar manner, mutatis mutandis, to the pipe end protector 1 of FIG. 11A. FIG. 13A shows a cross sectional view of a fourth embodiment of an assembly according to the invention and comprising the pipe end protector of FIG. 11A and the male pipe end of FIG. 12. FIG. 13B shows an enlarged view of part B of FIG. 13A.

The pipe end protector 1 is configured for a male pipe end 83 and the lip 21 of the axial lip seal 11 is configured to be bent away from the longitudinal axis 6 by a male nose surface 86 of the male pipe end 83 when the support portion 10 and the male pipe end 83 are moved axially towards each other during rotational make-up of the pipe end protector 1 on the male pipe end 83 in order to position the male pipe end 83 between the free rim 23 and the longitudinal axis 6 when (in use) a final make-up position 70 of the pipe end protector 1 on the male pipe end 83 is reached. The term between relates to the situation when seen in a radial direction 18 relative to the longitudinal axis 6.

The position of the male pipe end 83 between the free rim 23 and the longitudinal axis 6 ensures that the lip 21 is pushed against the male pipe end 83 to increase the sealing effect of the axial lip seal.

The axial lip seal 11 is configured to first create contact between the free rim 23 and the male nose surface 86 of the male pipe end 83 during the rotational make-up of the pipe end protector 1 on the male pipe end 83 and to subsequently move the free rim 23 along the male nose surface 8 and away from the longitudinal axis 6 when the rotational make-up is continued.

The axial lip seal 11 is to configured to move the free rim 23 along the male nose surface 86 extending under an angle β of about 90 degrees. In other examples, the angle β is between, and including, 70 degrees and 90 degrees, preferably between, and including, 80 degrees and 90 degrees. The male nose surface 86 is oriented to facilitate the movement of the free rim 23 away from the longitudinal axis 6.

The axial lip seal 11 is configured to be in contact with an outer edge 84 of the male pipe end 83 when the final make-up position 70 of the pipe end protector 1 on the male pipe end 83 is reached and the male nose surface 86 is located between the outer edge 84 and the longitudinal axis 6.

The axial lip seal 11 is configured to have an annular line contact 78 surrounding the longitudinal axis 6 with the outer edge 84 of the male pipe end 83 when the final make-up position 70 of the pipe end protector 1 on the male pipe end 83 is reached.

The free rim 23 is directed away from the longitudinal axis 6 when the axial lip seal 11 is free from forces applied by the male pipe end 83. This facilitates the bending of the lip 21 when the support portion 10 and the male pipe end 83 are moved axially towards each other during rotational make-up of the pipe end protector 1 on the male pipe end 83.

The lip 21 extends at the free rim 23 away from the longitudinal axis 6 when the axial lip seal 11 is free from forces applied by the male pipe end 83.

The free rim 23 is in radial direction located further away from the longitudinal axis 6 than the lip base portion 16 when the axial lip seal 11 is free from forces applied by the male pipe end 83.

The free rim 23 is directed towards the tubular portion 8 when the axial lip seal 11 is free from forces applied by the male pipe end 38.

The lip 21 extends at the free rim 23 towards the tubular portion 8 when the axial lip seal 11 is free from forces applied by the male pipe end 38.

The axial lip seal 11 is in radial direction located between the longitudinal axis 6 and the tubular portion 8. This applies to the situation in which the pipe end protector 1 is configured for a male pipe end 38.

The lip 21 of the axial lip seal 11 is configured to be bent towards the tubular portion 8 by the male nose surface 86 of the male pipe end 38 when the support portion 10 and the male pipe end 38 are moved axially towards each other during rotational make-up of the pipe end protector 1 on the male pipe end 38.

The free rim 23 is directed towards the protector threads 9 when the axial lip seal 11 is free from forces applied by the male pipe end 38.

The lip 21 extends at the free rim 23 towards the protector threads 9 when the axial lip seal 11 is free from forces applied by the male pipe end 38.

The pipe end protector 1 is configured to during make-up of the pipe end protector 1 on the male pipe end 38 axially move at least part of the protector threads 9 along the male nose surface 86 before the lip 21 is bent away from the longitudinal axis 6 by the male nose surface 86 of the male pipe end 38.

The free rim 23 is directed towards a circumferential surface 44 of the tubular portion 8 when the axial lip seal 11 is free from forces applied by the male pipe end 83. The circumferential surface 44 is an internal circumferential surface 47.

The protector threads 9 are provided at the internal circumferential surface 47 of the tubular portion 8.

The lip 21 extends at the free rim 23 towards the internal circumferential surface 47 when the axial lip seal 11 is free from forces applied by the male pipe end 83.

The free rim 23 is in radial direction located closer to the internal circumferential surface 47 than the lip base portion 16 when the axial lip seal 11 is free from forces applied by the male pipe end 83.

The seal support surface 7 extends at least partly radially from the internal circumferential surface 47 of the tubular portion 8.

The lip 21 of the axial lip seal 11 is configured to be bent towards the internal circumferential surface 47 by the male nose surface 86 of the male pipe end 83 when the support portion 10 and the male pipe end 83 are moved axially towards each other during rotational make-up of the pipe end protector 1 on the male pipe end 83.

The axial lip seal 11 is an internal lip seal 36 for the male pipe end 83. A further lip seal 150 is provided as an external lip seal 37 for the male pipe end 83.

The further lip seal 150 is a radial lip seal 140, and the further free rim 123 is located closer to the longitudinal axis 6 than the further lip base portion 116 and directed towards the longitudinal axis 6.

The further free rim 123 of the radial lip seal 140 is pushed radially outwards by a radial force Fr applied by the male pipe end 83.

The main body 5 comprises an annular body contact surface 72, the lip 21 is located between the body contact surface 72 and the longitudinal axis 6 and the axial lip seal 11 is configured to be in contact with the body contact surface 72 when (in use) the final make-up position 70 of the pipe end protector 1 on the male pipe end 83 is reached. This is similar to the embodiment discussed in relation to FIG. 5A.

The lip 21 comprises a first lip contact area 28 configured to be in contact with the male pipe end 83 when the final make-up position 70 of the pipe end protector 1 on the male pipe end 86 is reached and a second lip contact area 29 configured to be in contact with the body contact surface 72 when the final make-up position 70 of the pipe end protector 1 on the male pipe end 86 is reached, and the male pipe end 83 is located between the first and second lip contact areas 28, 29 and the longitudinal axis 6 when the final make-up position 70 of the pipe end protector 1 on the male pipe end 83 is reached. The body contact surface 72 is part of the internal circumferential surface 47 of the tubular portion 8.

The pipe threads 2 and the protector threads 9 are free running threads 81. In another example, the pipe threads 2 and the protector threads 9 are wedge threads.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the pipe end protector, assembly and the method according to the invention without departing from the scope as defined in the claims.

The first polymeric material and/or the second polymeric material may comprise additives such as colorants, fillers, flame retardants, pigments, reinforcing fibres, plasticisers, and other additives known to a person skilled in the art.

The invention claimed is:

1. A pipe end protector for protecting pipe threads provided on a pipe end of a pipe component for exploration and production of a hydrocarbon well, said pipe end protector comprising:
a main body having a longitudinal axis, a support portion having an at least partly radially extending annular seal support surface, and a tubular portion provided with protector threads configured to cooperate with the pipe threads of the pipe end, and
an annular flexible axial lip seal provided on the seal support surface, wherein:
the main body is made from a first polymeric material having a first elastic modulus,
the axial lip seal is made from a second polymeric material having a second elastic modulus which is lower than the first elastic modulus,
the axial lip seal comprises an annular lip base portion which extends radially along at least part of the seal support surface and is attached to the seal support surface by overmoulding, and
the axial lip seal comprises an annular lip which extends from the lip base portion to a free rim of the lip, which free rim is axially spaced from the lip base portion, and wherein:
the pipe end protector is configured for a female pipe end and the lip is configured to be bent towards the longitudinal axis by a female nose surface of the female pipe end when the support portion and the female pipe end are moved axially towards each other during rotational make-up of the pipe end protector on the female pipe end in order to position the free rim between the female pipe end and the longitudinal axis when a final make-up position of the pipe end protector on the female pipe end is reached, OR
the pipe end protector is configured for a male pipe end and the lip is configured to be bent away from the longitudinal axis by a male nose surface of the male pipe end when the support portion and the male pipe end are moved axially towards each other during rotational make-up of the pipe end protector on the male pipe end in order to position the male pipe end between the free rim and the longitudinal axis when a final make-up position of the pipe end protector on the male pipe end is reached.

2. The pipe end protector of claim 1, wherein the lip comprises an annular outer lip surface and the axial lip seal is configured to hold the outer lip surface in contact with the pipe end when the final make-up position of the pipe end protector on the pipe end is reached.

3. The pipe end protector of claim 1, wherein:
the main body comprises an annular body contact surface located between the lip and the longitudinal axis and the axial lip seal is configured to be in contact with the body contact surface when the final make-up position of the pipe end protector on the female pipe end is reached, OR
the main body comprises an annular body contact surface, the lip is located between the body contact surface and the longitudinal axis and the axial lip seal is configured to be in contact with the body contact surface when the final make-up position of the pipe end protector on the male pipe end is reached.

4. The pipe end protector of claim 3, wherein the body contact surface extends under an angle $\alpha$ of between, and including, 35 degrees and 55 degrees.

5. The pipe end protector of claim 1, wherein the axial lip seal is configured to have an annular line contact surrounding the longitudinal axis with the pipe end when the final make-up position of the pipe end protector on the pipe end is reached.

6. The pipe end protector of claim 1, wherein:
the free rim is directed towards the longitudinal axis when the axial lip seal is free from forces applied by the female pipe end, OR
the free rim is directed away from the longitudinal axis when the axial lip seal is free from forces applied by the male pipe end.

7. The pipe end protector of claim 1, wherein:
the axial lip seal is an external lip seal for the female pipe end, OR
the axial lip seal is an internal lip seal for the male pipe end.

8. The pipe end protector of claim 1, wherein the pipe threads and the protector threads are wedge threads.

9. The pipe end protector of claim 1, wherein the first polymeric material and the second polymeric material are selected to adhesively attach to each other by overmoulding.

10. The pipe end protector of claim 1, wherein the first polymeric material of the main body is a polyolefin, and the second polymeric material of the lip seal is an elastomer.

11. The pipe end protector of claim 1, wherein:
the main body comprises a further support portion having an at least partly radially extending annular further seal support surface,
the pipe end protector comprises an annular flexible further lip seal provided on the further seal support surface,
the further lip seal is made from a third polymeric material having a third elastic modulus which is lower than the first elastic modulus, and
the further lip seal comprises an annular further lip base portion which extends radially along at least part of the further seal support surface and is attached to the further seal support surface by overmoulding.

12. The pipe end protector of claim 11, wherein:
the further lip seal is an internal lip seal for the female pipe end, OR
the further lip seal is an external lip seal for the male pipe end.

13. The pipe end protector of claim 11, wherein the further lip seal comprises an annular further lip which extends from a foot of the further lip being attached to the further lip base portion to a further free rim of the further lip being axially spaced from the further lip base portion, and wherein the foot and the further free rim are radially offset.

14. The pipe end protector of claim 13, wherein:
the further lip seal is a further axial lip seal,
the further axial lip seal comprises an annular support base portion which extends radially along at least part of the further seal support surface and is attached to the further seal support surface by overmoulding,
the support base portion comprises an annular base contact surface configured to, in use, contact an annular lip contact surface of the further lip,
the further lip base portion and the support base portion are radially spaced from each other, and
the further lip and the support base portion are axially spaced from each other.

15. The pipe end protector of claim 14, wherein the further axial lip seal comprises an annular seal opening located between the lip contact surface and the base contact surface, and the seal opening provides access to an annular empty space which in a cross sectional view along the longitudinal axis is surrounded by the further lip seal, the further lip base portion, and the support base portion.

16. The pipe end protector of claim 13, wherein:
the further lip seal is a radial lip seal, and wherein:
the further free rim is located further from the longitudinal axis than the further lip base portion and directed away from the longitudinal axis, OR
the further free rim is located closer to the longitudinal axis than the further lip base portion and directed towards the longitudinal axis.

17. An assembly, comprising:
a pipe component for exploration and production of a hydrocarbon well, which pipe component has a female pipe end provided with pipe threads, and the pipe end protector of claim 1, wherein the pipe threads and the protector threads are screwed in each other and the female pipe end is located in the final make-up position and the free rim of the lip is located between the female pipe end and the longitudinal axis, OR
a pipe component for exploration and production of a hydrocarbon well, which pipe component has a male pipe end provided with pipe threads, and a pipe end protector of claim 1, wherein the pipe threads and the protector threads are screwed in each other and the male pipe end is located in the final make-up position and the male pipe end is located between the free rim and the longitudinal axis.

18. The pipe and protector of claim 17, wherein the annular further lip of the further axial lip seal is pushed in contact with the support base portion by an axial force Fa applied by the pipe end.

19. The pipe and protector of claim 16, wherein:
the further free rim of the annular further lip of the radial lip seal is pushed radially inwards by a radial force Fr applied by the female pipe end, OR
the further free rim of the annular further lip of the radial lip seal is pushed radially outwards by a radial force Fr applied by the male pipe end.

20. A method for producing the pipe end protector of claim 1, said method comprising:
injecting the first polymeric material in a main mould configured to form the main body,
after removing the main body from the main mould, placing an axial lip seal mould over the seal support surface, and
injecting the second polymeric material in the axial lip seal mould which is configured to form the annular flexible axial lip seal.

21. The method of claim 20, wherein the main mould is configured to form the main body comprising a further support portion having an at least partly radially extending annular further seal support surface, and the method comprises:
placing a further lip seal mould over the further seal support surface,
injecting a third polymeric material in the further lip seal mould which is a further axial lip seal mould configured to form a further axial lip seal having a third elastic modulus being lower than the first elastic modulus and comprising:
an annular further lip base portion which extends radially along at least part of the further seal support surface and is attached to the further seal support surface by overmoulding,
an annular support base portion which extends radially along at least part of the further seal support surface and is attached to the further seal support surface by overmoulding, and
an annular base contact surface located on the support base portion and configured to, in use, contact a lip contact surface located on the lip, wherein:
the further lip base portion and the support base portion are radially spaced from each other,
the further lip and the support base portion are axially spaced from each other,
the further axial lip seal comprises an annular seal opening located between the lip contact surface and the base contact surface, and
the seal opening provides access to an annular empty space which in a cross-section view along the longitudinal axis is surrounded by the further lip, the further lip base portion, and the support base portion,
wherein the further axial lip seal mould comprises an annular space mould portion configured to form the empty space of the further axial lip seal, and
removing the annular space mould portion via the seal opening of the further axial lip seal after the third polymeric material has been injected in the further axial lip seal mould.

22. The method of claim 20, wherein the main mould is configured to form the main body comprising a further support portion having an at least partly radially extending annular further seal support surface, and the method further comprises:
placing a further lip seal mould over the further seal support surface, and
injecting a third polymeric material in the further lip seal mould which is a radial lip seal mould configured to form a radial lip seal having a third elastic modulus being lower than the first elastic modulus and wherein the further free rim is located further from the longitudinal axis than the further lip base portion and directed away from the longitudinal axis.

* * * * *

UNITED STATES PATENT AND TRADEMARK OFFICE
CERTIFICATE OF CORRECTION

PATENT NO. : 11,873,942 B2
APPLICATION NO. : 17/780472
DATED : January 16, 2024
INVENTOR(S) : Egger et al.

It is certified that error appears in the above-identified patent and that said Letters Patent is hereby corrected as shown below:

In the Specification

Column 2, Line 48, delete "positon" and insert -- position --.

Column 2, Line 49, delete "positon" and insert -- position --.

Column 4, Line 42, delete "continued" and insert -- continued. --.

Column 4, Line 64, delete "reached" and insert -- reached. --.

Column 11, Line 12-13, delete "overmoulding" and insert -- overmoulding, --.

Column 15, Line 50, delete "and" and insert -- 10 and --.

Column 17, Line 33, delete "FIG." and insert -- FIGS. --.

Column 18, Line 31, delete "FIG." and insert -- FIGS. --.

In the Claims

Column 25, Line 46, Claim 18, delete "and" and insert -- end --.

Column 25, Line 46, Claim 18, delete "claim 17," and insert -- claim 14, --.

Column 25, Line 50, Claim 19, delete "and" and insert -- end --.

Signed and Sealed this
Twenty-third Day of April, 2024

Katherine Kelly Vidal
*Director of the United States Patent and Trademark Office*